(12) United States Patent
Mahdi et al.

(10) Patent No.: US 8,208,442 B2
(45) Date of Patent: Jun. 26, 2012

(54) MULTIMEDIA SUBSYSTEM SERVICE CONTROL FOR CIRCUIT-SWITCHED SUBSYSTEM CALLS

(75) Inventors: Kaniz Mahdi, Carrollton, TX (US); Dany Sylvain, Gatineau (CA)

(73) Assignee: Genband US LLC, Plano, TX (US)

( * ) Notice: Subject to any disclaimer, the term of this patent is extended or adjusted under 35 U.S.C. 154(b) by 951 days.

(21) Appl. No.: 11/466,115

(22) Filed: Aug. 22, 2006

(65) Prior Publication Data

US 2007/0058788 A1 Mar. 15, 2007

Related U.S. Application Data

(60) Provisional application No. 60/710,056, filed on Aug. 22, 2005, provisional application No. 60/724,730, filed on Oct. 7, 2005, provisional application No. 60/749,155, filed on Dec. 9, 2005, provisional application No. 60/818,950, filed on Jul. 6, 2006, provisional application No. 60/832,818, filed on Jul. 24, 2006.

(51) Int. Cl.
| | |
|---|---|
| H04W 4/00 | (2009.01) |
| H04W 36/00 | (2009.01) |
| H04L 12/66 | (2006.01) |
| H04L 12/28 | (2006.01) |
| H04L 12/56 | (2006.01) |
| H04J 3/16 | (2006.01) |
| H04J 3/22 | (2006.01) |

(52) U.S. Cl. ........ 370/331; 370/353; 370/354; 370/355; 370/356; 370/402; 370/467; 370/469; 455/432.1; 455/436

(58) Field of Classification Search .................. 370/351, 370/352, 328
See application file for complete search history.

(56) References Cited

U.S. PATENT DOCUMENTS

| | | | |
|---|---|---|---|
| 5,497,411 A | 3/1996 | Pellerin | |
| 6,067,453 A | 5/2000 | Adiwoso et al. | |
| 6,208,627 B1* | 3/2001 | Menon et al. | 370/328 |
| 6,353,596 B1 | 3/2002 | Grossglauser et al. | |
| 6,614,897 B1 | 9/2003 | Curtis et al. | |
| 6,721,565 B1 | 4/2004 | Ejzak et al. | |

(Continued)

FOREIGN PATENT DOCUMENTS

CA 2 501 991 A1 4/2004

(Continued)

OTHER PUBLICATIONS

International Search Report for PCT/IB2006/002282 mailed Feb. 2, 2007.

(Continued)

*Primary Examiner* — Nishant B Divecha
(74) *Attorney, Agent, or Firm* — Jenkins, Wilson, Taylor & Hunt, P.A.

(57) ABSTRACT

The present invention allows calls that are controlled by a multimedia subsystem (MS) to employ bearer paths that are supported in whole or in part by a circuit-switched subsystem (CS). As such, calls controlled by the MS can have a portion of the bearer path provided through the CS when needed or desired. To facilitate such control, a session control signaling path is established between a user element currently supported by the CS and a remote user agent (RUA), which represents the user element in the MS. While a portion of the bearer path for the call is supported by the CS, the session control signaling path extends the reach of the MS to the user element.

20 Claims, 22 Drawing Sheets

U.S. PATENT DOCUMENTS

| | | | |
|---|---|---|---|
| 6,801,615 B2 | 10/2004 | Stumer et al. | |
| 6,961,774 B1 | 11/2005 | Shannon et al. | |
| 6,970,459 B1 | 11/2005 | Meier | |
| 6,999,770 B2 | 2/2006 | Hirsbrunner et al. | |
| 7,099,309 B2 | 8/2006 | Davidson | |
| 7,206,582 B2 | 4/2007 | Tom et al. | |
| 7,313,666 B1 | 12/2007 | Saminda De Silva et al. | |
| 7,492,886 B1 | 2/2009 | Kalmanek, Jr. et al. | |
| 7,664,495 B1 | 2/2010 | Bonner et al. | |
| 7,729,489 B2 | 6/2010 | Lee et al. | |
| 7,792,974 B2 | 9/2010 | Westman et al. | |
| 8,045,568 B2 | 10/2011 | Sylvain et al. | |
| 2001/0055982 A1 | 12/2001 | Umeda | |
| 2002/0037723 A1 | 3/2002 | Roach | |
| 2002/0133600 A1 | 9/2002 | Williams et al. | |
| 2002/0188562 A1 | 12/2002 | Igarashi et al. | |
| 2003/0027569 A1 | 2/2003 | Ejzak | |
| 2003/0148765 A1 | 8/2003 | Ma et al. | |
| 2003/0174688 A1 | 9/2003 | Ahmed et al. | |
| 2004/0002335 A1 | 1/2004 | Pan et al. | |
| 2004/0003046 A1 | 1/2004 | Grabelsky et al. | |
| 2004/0028080 A1 | 2/2004 | Samarasinghe et al. | |
| 2004/0067754 A1 | 4/2004 | Gao et al. | |
| 2004/0157600 A1 | 8/2004 | Stumpert et al. | |
| 2004/0219905 A1 | 11/2004 | Blumenthal et al. | |
| 2004/0229469 A1 | 11/2004 | Marsh et al. | |
| 2004/0246990 A1 | 12/2004 | Krishnamurthi et al. | |
| 2004/0249887 A1 | 12/2004 | Garcia-Martin et al. | |
| 2005/0002407 A1 | 1/2005 | Shaheen et al. | |
| 2005/0003797 A1 | 1/2005 | Baldwin | |
| 2005/0003821 A1 | 1/2005 | Sylvain | |
| 2005/0243870 A1 | 11/2005 | Balogh et al. | |
| 2005/0245261 A1 | 11/2005 | Ejzak | |
| 2005/0265304 A1 | 12/2005 | Kim et al. | |
| 2005/0286531 A1 | 12/2005 | Tuohino et al. | |
| 2006/0002355 A1 | 1/2006 | Baek et al. | |
| 2006/0002380 A1 | 1/2006 | Bollinger et al. | |
| 2006/0034270 A1 | 2/2006 | Haase et al. | |
| 2006/0035637 A1 | 2/2006 | Westman | |
| 2006/0083199 A1 | 4/2006 | Yang | |
| 2006/0087982 A1 | 4/2006 | Kuure et al. | |
| 2006/0094431 A1 | 5/2006 | Saifullah et al. | |
| 2006/0142004 A1 | 6/2006 | He et al. | |
| 2006/0187904 A1 | 8/2006 | Oouchi | |
| 2006/0198360 A1 | 9/2006 | Biage et al. | |
| 2006/0209805 A1 | 9/2006 | Mahdi | |
| 2006/0217112 A1 | 9/2006 | Mo | |
| 2006/0268928 A1 | 11/2006 | Barzegar et al. | |
| 2007/0004415 A1* | 1/2007 | Abedi | 455/442 |
| 2007/0014281 A1* | 1/2007 | Kant | 370/352 |
| 2007/0041367 A1 | 2/2007 | Mahdi | |
| 2007/0066304 A1 | 3/2007 | Lee | |
| 2007/0072605 A1 | 3/2007 | Poczo | |
| 2007/0100981 A1 | 5/2007 | Adamczyk et al. | |
| 2007/0153736 A1 | 7/2007 | Mow et al. | |
| 2007/0206568 A1 | 9/2007 | Silver et al. | |
| 2008/0025263 A1 | 1/2008 | Pelkonen | |
| 2008/0049725 A1 | 2/2008 | Rasanen | |
| 2008/0144637 A1 | 6/2008 | Sylvain et al. | |
| 2008/0160991 A1 | 7/2008 | Constantinof et al. | |
| 2008/0268818 A1 | 10/2008 | Keller et al. | |
| 2009/0190579 A1 | 7/2009 | Witzel et al. | |
| 2010/0124897 A1 | 5/2010 | Edge | |

FOREIGN PATENT DOCUMENTS

| | | |
|---|---|---|
| CN | 101292489 A | 11/2008 |
| CN | 102138311 A | 7/2011 |
| EP | 1 816 877 A1 | 8/2007 |
| EP | 1 965 592 A1 | 9/2008 |
| WO | WO 00/60785 A1 | 10/2000 |
| WO | WO0103450 A1 | 1/2001 |
| WO | WO 01/22657 A1 | 3/2001 |
| WO | WO 2004/019173 A2 | 3/2004 |
| WO | WO 2004/073279 A1 | 8/2004 |
| WO | WO 2006/097837 A1 | 9/2006 |
| WO | WO 2006/105732 A1 | 10/2006 |
| WO | WO 2006/126072 A1 | 11/2006 |
| WO | WO 2007/023358 A2 | 3/2007 |
| WO | WO 2008038101 A2 | 4/2008 |

OTHER PUBLICATIONS

Official Action for U.S. Appl. No. 11/378,776 (Aug. 18, 2010).
Official Action for U.S. Appl. No. 11/440,165 (Aug. 4, 2010).
3GPP, "3rd Generation Partnership Project; Technical Specification Group Core Network and Terminals; Mobile Radio Interface Layer 3 Specification; Core Network Protocols; Stage 3 (Release 8)," 3GPP TS 24.008 V8.4.0 (Dec. 2008).
International Search Report for PCT/UB2006/001362 (Oct. 5, 2006).
International Search Report for PCT/IB2006/000607 (Aug. 28, 2006).
3GPP, "3rd Generation Partnership Project; Technical Specification Group Services and System Aspects; Voice Call Continuity Between CS and IMS; Stage 2 (Release 7)," 3GPP TS 23.206 V1.1.0 (Jul. 2006).
3GPP, "3rd Generation Partnership Project; Technical Specification Group Services and System Aspects; Multimedia Broadcast/Multicast Service (MBMS); Architecture and Functional Description (Release 6)," 3GPP TS 23.246 V6.10.0 (Jun. 2006).
3GPP, "3rd Generation Partnership Project; Technical Specification Group Services and System Aspects; Voice Call Continuity Between CS and IMS Study (Release 7)," 3GPP TR 23.806 V1.4.0 (Aug. 2005).
U.S. Appl. No. 60/690,843 (Jun. 15, 2005).
Strater et al., "Seamless Mobility Between Home Networks and Cable Service," Motorola White Paper (May 27, 2005).
3GPP, "3rd Generation Partnership Project; Universal Mobile Telecommunications System; Mobile Radio Interface Layer 3 Specification, Core Network Protocols—Stage 3," TS 24.008 V3.0.0 (Jul. 1999).
Final Official Action for U.S. Appl. No. 11/440,165 (Jun. 22, 2011).
Notice of Abandonment for U.S. Appl. No. 11/452,743 (Apr. 27, 2011).
Chinese Official Action for Chinese patent application No. 200680039435.0 (Mar. 22, 2011).
Final Official Action for U.S. Appl. No. 11/378,776 (Mar. 9, 2011).
Final Official Action for U.S. Appl. No. 11/616,679 (Feb. 25, 2011).
Official Action for U.S. Appl. No. 11/440,165 (Feb. 16, 2011).
Official Action for U.S. Appl. No. 11/536,921 (Dec. 3, 2010).
Non-Final Official Action for U.S. Appl. No. 11/452,743 (Oct. 13, 2010).
Official Action for U.S. Appl. No. 11/616,679 (Aug. 13, 2010).
Final Official Action for U.S. Appl. No. 11/452,743 (Mar. 30, 2010).
Final Official Action for U.S. Appl. No. 11/536,921 (Mar. 4, 2010).
Non-Final Official Action for U.S. Appl. No. 11/452,743 (Oct. 2, 2009).
Official Action for U.S. Appl. No. 11/536,921 (Jul. 21, 2009).
European Search Report for EP 07024903 (Jul. 23, 2008).
3RD Generation Partnership Project (3GPP), "IP Multimedia Subsystem (IMS) Centralized Services," Technical Specification 3GPP TS 23.292 v8.0.0, Stage 2, Release 8, 3GPP Organizational Partners (Jun. 2008).
3GPP, "3rd Generation Partnership Project; Technical Specification Group Services and System Aspects; IP Miltimedia Subsystem (IMS) Centralized Services (Release 8)," 3GPP TS 23.892 V8.0.1 (Mar. 2008).
International Search Report for PCT/IB2007/002787 (Mar. 7, 2008).
3GPP, "3rd Generation Partnership Project; Technical Specification Group Services and System Aspects; IP Miltimedia Subsystem (IMS); Stage 2 (Release 8)," 3GPP TS 23.228 V8.1.0 (Jun. 2007).
3GPP, "3rd Generation Partnership Project; Technical Specification Group Core Network and Terminals; Mobile Radio Interface Layer 3 Specification; Core Network Protocols; Stage 3 (Release 7)," 3GPP TS 24.008 V7.8.0 (Jun. 2007).
3GPP SA WG2, "3rd Generation Partnership Project; Technical Specification Group Core Network and Terminals; Voice Call Continuity Between the Circuit-Switched (CS) Domain and the IP Multimedia (IP) Core Network (CN) Subsystem; Stage 3 (Release 7), TS 24.206 V.7.0.0," Technical Specification (TS), Dec. 8, 2006, pp. 1-114, vol. 24.206 No. V7.0.0, 3GPPP Organizational Partners' Publications Offices.

3GPP CT WG1, "3rd Gneration Partnership Project; Technical Specification Group Services and System Aspects; voice Call Continuity (VCC) Between Circuit Switched (CS) and IP Multimedia Subsystem (IMS); Stage 2 (Release 7), TS 23.206 V7.1.0," Technical Specification (TS), Dec. 1, 2006, pp. 1-36, vol. 23.206 No. V7.1.0, 3GPP Organizational Partner's Publications Offices.

International Search Report for PCT/IB2006/001564, Mailed Nov. 14, 2006).

Commonly-assigned, co-pending U.S. Appl. No. 11/452,743 for "Selective Call Anchoring in a Multimedia Subsystem," (Unpublished, filed Jun. 14, 2006).

"3rd Generation Partnership Project; Technical Specification Group Core Network and Terminals; Mobile radio interface Layer 3 specification; Core network protocols; Stage 3 (Release 7)," 3GPP TS 24.008, V7.4.0, pp. 1-534 (Jun. 2006).

3GPP SA WG2, "Voice Call Continuity Between CS and IMS Study (3GPP TR 23.806 version 7.00.0 Release 7)," Technical Specification (TS), Dec. 1, 2005, pp. 1-153, vol. 23.806 No. V7.0.0, 3GPP Organizational Partners' Publications Offices.

Non-Final Official Action for U.S. Appl. No. 11/378,776 (Jan. 20, 2012).

Non-Final Official Action for U.S. Appl. No. 11/440,165 (Jan. 19, 2012).

Final Official Action for U.S. Appl. No. 11/554,930 (Dec. 2, 2011).

Non-Final Official Action for U.S. Appl. No. 12/209,829 (Dec. 1, 2011).

Notice of Allowance and Fee(s) Due for U.S. Appl. No. 11/452,743 (Nov. 7, 2011).

Notice of Panel Decision from Pre-Appeal Brief Review for U.S. Appl. No. 11/440,165 (Nov. 3, 2011).

Non-Final Official Action for U.S. Appl. No. 11/554,930 (Jul. 7, 2011).

Notice of Allowance and Fee(s) Due for U.S. Appl. No. 11/536,921 (Jun. 30, 2011).

Decision on Petition to Revive for U.S. Appl. No. 11/452,743 (Jun. 22, 2011).

Notice of Panel Decision from Pre-Appeal Brief Review for U.S. Appl. No. 11/554,930 (Apr. 19, 2011).

Final Official Action for U.S. Appl. No. 11/554,930 (Dec. 3, 2010).

Non-Final Official Action for U.S. Appl. No. 11/554,930 (Apr. 14, 2010).

Final Official Action for U.S. Appl. No. 11/554,930 (Sep. 2, 2009).

Communication pursuant to Article 94(3) EPC for European Application No. 07024903.2 (Apr. 2, 2009).

Non-Final Official Action for U.S. Appl. No. 11/554,930 (Feb. 6, 2009).

Commonly-assigned, co-pending U.S. Appl. No. 12/209,829 for "Adding a Service Control Channel After Session Establishment," (Unpublished, filed Sep. 12, 2008).

"3rd Generation Partnership Project; Technical Specification Group Core Network and Terminals radio interface Layer 3 specification; Core network protocols; Stage 3 (Release 7)," 3GPP TS 24.008 V7.5.0, pp. 1-538 (Sep. 2006).

"3rd Generation Partnership Project; Technical Specification Group Services and System Aspects; IP Multimedia Subsystem (IMS); Stage 2 (Release 7)," 3 GPP TS 23.228 V7.5.0, pp. 1-214 (Sep. 2006).

3GPP TSG-SA WG2 Meeting #46, Technical Document: Tdoc S2-050995, Service Continuity—Network Domain Selection (May 13, 2006).

* cited by examiner

MULTIMEDIA SUBSYSTEM SERVICE CONTROL FOR CIRCUIT-SWITCHED SUBSYSTEM CALLS

This application claims the benefit of U.S. provisional patent application Ser. No. 60/710,056 filed Aug. 22, 2005; U.S. provisional patent application Ser. No. 60/724,730 filed Oct. 7, 2005; U.S. provisional patent application Ser. No. 60/818,950 filed Jul. 6, 2006; U.S. provisional patent application Ser. No. 60/832,818 filed Jul. 24, 2006; and U.S. provisional patent application Ser. No. 60/749,155 filed Dec. 9, 2005, the disclosures of which are incorporated herein by reference in their entireties.

FIELD OF THE INVENTION

The present invention relates to telecommunications, and in particular to a technique to allow control of circuit-switched communications using a multimedia subsystem.

BACKGROUND OF THE INVENTION

The Internet Protocol (IP) multimedia subsystem (IMS) is a standardized architecture for providing multimedia services over networks supporting packet-based communications. IMS is configured to provide a centralized service control system across different packet network architectures, which are referred to as packet subsystems (PSs). As such, IMS can support multimedia services over different types of access networks. These access networks may support fixed or wireless communications, as long as there is a mechanism to support packet-based communications. IMS runs over the standard IP. IMS generally uses VoIP technology based on a third generation partnership project (3GPP) implementation of the Session Initiation Protocol (SIP). With IMS, services can be provided to subscribers regardless of their location, access technology, and terminal. A general overview of IMS operation follows.

User elements (UEs) are capable of communicating with each other via their respective access networks. For a given call or session between the user elements, the IMS architecture will provide the requisite signaling to establish and control the call or session. For conciseness and readability, calls or sessions are collectively referred to as calls. Further, the media delivered in the calls may be data, audio, video, or voice. The IMS architecture employs several call/session control functions (CSCFs), which are implemented as SIP servers or proxies. These CSCFs are used to process SIP signaling messages, which facilitate the signaling required for establishing and controlling the calls.

Session signaling may be provided in various networks, such as a visited network, a home network, and a called network. The visited network represents the network currently supporting a roaming user element of User A, who is the calling party originating a call. The home network is the home services network for the user element of User A, and the called network is a visited or home network for the user element of User B, who is the called party that is terminating the call.

Each of these networks may include CSCFs. The CSCFs are implemented having three primary functions: a proxy CSCF (P-CSCF), an interrogating CSCF (I-CSCF), and a serving CSCF (S-CSCF). The P-CSCF is a SIP proxy that is generally the first point of contact for a user element, and can be located in a visited network or home network. The P-CSCF in the visited network is associated with the user element of User A. User A's user element may be assigned to the P-CSCF in the visited network during registration. The P-CSCF in the visited network is in the signaling path of certain, if not all, signaling messages for the call, and will authenticate the user and establish a security association with the User A's user element. The P-CSCF in the visited network may also compress and decompress SIP messages in an effort to reduce signaling overhead or increase response times over slow radio links. Further, the P-CSCF may map the user ID associated with the user element to an appropriate I-CSCF.

To initiate the call with User B's user element, User A's user element will send to the P-CSCF in the visited network a session initiation message identifying User B's user element as the called party. The P-CSCF in the visited network will route the call to the I-CSCF in the home network. The I-CSCF is also a SIP proxy and is generally located at the edge of an administrative domain, which is the home network in this example. The IP address of the I-CSCF is published in the domain name service of the administrative domain, such that the P-CSCF in the visited network, as well as any other entities, can locate the I-CSCF and use it as a point of entry for all signaling messages for the administrative domain.

Upon receipt of the session initiation message from the P-CSCF in the visited network, the I-CSCF may access a home subscriber server (HSS) to identify the S-CSCF to use for session control. The HSS is essentially a master database that supports various network entities that are involved in establishing and controlling calls. The HSS contains user profiles and other related subscription information, assists in authentication and authorization of a user, and can provide information about the physical location of a user by keeping track of the location of the user element.

The S-CSCF is generally the central signaling node in the IMS architecture for the user element of User A. Upon receipt of the session initiation message from the I-CSCF in the home network, the S-CSCF in the home network will may access the HSS to determine the location of User B's user element and identify the S-CSCF in the called network to use for session control. The S-CSCF in the home network will then route the session initiation message to the S-CSCF in the called network, which is serving User B's user element.

Upon receipt of the session initiation message from the S-CSCF in the home network, the S-CSCF in the called network will route the call to the P-CSCF, which is serving User B's user element in the called network. The P-CSCF in the called network will then route the session initiation message to the user element.

The S-CSCFs used for the routing the session initiation message remain in the signaling path for subsequent signaling messages for the call supported between the user elements, and can inspect signaling messages traveling in either direction. Similarly, the P-CSCFs and I-CSCFs, which are invoked during initial routing, may remain in the signaling path and handle signaling messages exchanged between the user elements during the call. The bearer path is provided over a transport plane and session control is provided in the control plane, which is generally comprised of the CSCFs.

Based on inspecting the signaling messages, the S-CSCFs can determine if and when to invoke multimedia services for the user elements or associated calls. The multimedia services are provided in a service plane, which is generally made up of numerous application servers, which are capable of providing one or more multimedia services. To provide a multimedia service, the S-CSCF will identify the appropriate multimedia service and forward signaling messages to the application server chosen to provide the multimedia service. The application server will provide the multimedia service by effectively processing the signaling message and returning the processed signaling message back to the S-CSCF, if necessary, which will forward the signaling message in a desired fashion. The application server providing a selected multimedia service will also reside in the signaling path. With IMS, call control and service presentation is virtually limitless.

Although IMS provides tremendous flexibility for controlling calls and facilitating multimedia services within packet subsystems (PSs), circuit-switched subsystems (CSs) continue to support a vast majority of voice-based communications. In light of the coverage of CSs and the benefits of IMS, efforts are underway to interwork CSs and PSs, as well as control calls and provide associated multimedia services associated with the calls using IMS. Current efforts generally employ a PS for calls, even if a CS is available. Given the current state of PSs, CSs often provide better quality of service for voice calls due to network capability, loads, or environment conditions. Thus, IMS controlled calls that would benefit from being provided at least in part by an available CS are still supported by the PS. As such, there is a need to for an effective and efficient technique to establish calls through the CS while controlling the calls and providing associated services using IMS. There is a further need to maintain such control across domain transfers between CS and PS domains.

SUMMARY OF THE INVENTION

The present invention supports the interworking of a circuit-switched subsystem (CS) and a multimedia subsystem (MS). In particular, the present invention allows calls that are controlled by the MS to employ bearer paths that are supported in whole or in part by the CS. As such, calls controlled by the MS can have a portion of the bearer path provided through the CS when needed or desired. To facilitate such control, a session control signaling path is established between a user element currently supported by the CS and a remote user agent (RUA), which represents the user element in the MS. While a portion of the bearer path for the call is supported by the CS, the session control signaling path extends the reach of the MS to the user element. A CS Access Adaptation Function (CAAF) is provided along the session control signaling path to provide the message or protocol conversion necessary to allow the RUA and the user element to exchange session control signaling messages between the CS and MS. With the present invention, calls are able to take advantage of bearer paths through the CS and call control by the MS.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention supports the interworking of a circuit-switched subsystem (CS) and a multimedia subsystem (MS). In particular, the present invention allows calls that are controlled by the MS to employ bearer paths that are supported in whole or in part by the CS. As such, calls controlled by the MS can have a portion of the bearer path provided through the CS when needed or desired. To facilitate such control, a session control signaling path is established between a user element currently supported by the CS and a remote user agent (RUA), which represents the user element in the MS. While a portion of the bearer path for the call is supported by the CS, the session control signaling path extends the reach of the MS to the user element. A CS Access Adaptation Function (CAAF) is provided along the session control signaling path to provide the message or protocol conversion necessary to allow the RUA and the user element to exchange session control signaling messages between the CS and MS. With the present invention, calls are able to take advantage of bearer paths through the CS and call control by the MS. There are numerous embodiments of the present invention. A detailed description of several of these embodiments follows.

For the following description, the term "call" is used for clarity and consistency. Those skilled in the art will recognize that a call may be a voice or other media session, which is capable of supporting audio, video, and data communications. Further, the session control protocol used for the following description is the Session Initiation Protocol (SIP) and the MS is a service delivery platform referred to as the Internet Protocol (IP) Multimedia Subsystem (IMS) and defined by the Third Generation Partnership Project (3GPP). Those skilled in the art will recognize other application service delivery platforms and session control protocols.

Figure 1:
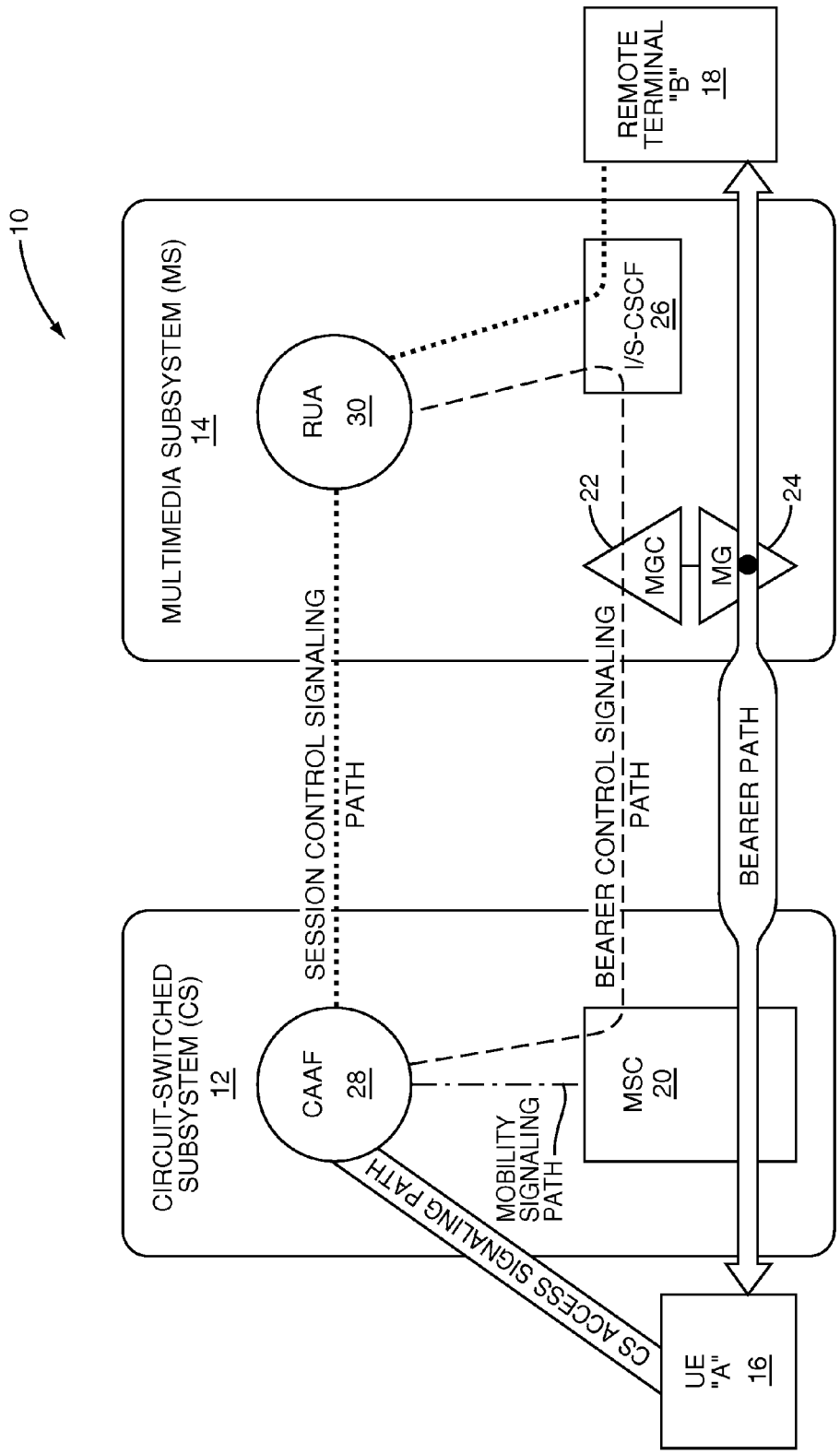
FIG. 1 is a communication environment according to a first embodiment of the present invention.

With reference to FIG. 1, a communication environment 10 is presented as having a CS 12 and an MS 14. A user element (UE) 16, which is supported by the CS 12, is capable of establishing a bearer path in whole or in part via the CS 12 for a call, which is controlled by the MS 14. As illustrated, the call extends to a remote terminal 18, which is supported by a packet subsystem (PS) associated with the MS 14. The CS 12 includes a mobile switching center (MSC) 20, which is capable of directly or indirectly interacting with a media gateway controller (MGC) 22 and an associated media gateway (MG) 24 of the MS 14. The CS portion of the bearer path for the call is established between the user element 16 and the media gateway 24 via the MSC 20. The PS portion of the bearer path for the call is established between the MG 24 and the remote terminal 18. The present invention allows the call to be established and controlled via the MS 14, even though a portion of the bearer path is established through the CS 12. The user element 16 does not need to be aware that the call is controlled by the MS 14. As such, legacy terminals that are normally supported only by the CS 12 are able to take advantage of the services of the MS 14 with the present invention.

A call session control function (CSCF) is located in the call signaling path in the MS 14 to invoke any number of application servers for processing the session signaling. IMS defines different types of CSCFs, including interrogating CSCFs (I-CSCFs) and serving CSCFs (S-CSCFs). An I-CSCF generally acts as a gateway for at least initial session signaling in the MS 14 and is used to identify an appropriate S-CSCF, which is used to control session signaling for the call. In the following description, an I/S-CSCF 26 is used to represent the functions of the I-CSCF and the S-CSCF.

In the illustrated embodiment, a CAAF 28 is employed in the call signaling path between the user element 16 and the MSC 20 in the CS 12. The CAAF 28 essentially separates CS access signaling provided by the user element 16 into three types of signaling—mobility signaling, session control signaling, and bearer control signaling. The mobility signaling relates to access network control, such as access network registration, handoffs from one cell to another in the access network, and the like. The mobility signaling is simply forwarded to the MSC 20, which will process the mobility signaling in traditional fashion. Notably, the MSC 20 need not be aware that the CS access signaling is being intercepted and processed by the CAAF 28 before being presented to the MSC 20.

The bearer control signaling is processed and used to instruct the MCS 20 to establish CS bearer portion of a bearer path into the MS 14. In particular, the CAAF 28 instructs the MSC to route the call to the RUA 30, which represents the user element 16 to the MS 14. The RUA 30 may also appear as an application service, which is accessible to the I/S-CSCF 26. The MSC 20 is provisioned to route calls intended for the RUA 30 to the MGC 22, which will route the call to the RUA 30 via the I/S-CSCF 26 in the MS 14. As a result, the call is routed from the CAAF 28 to the RUA 30 via the MSC 20 and the MGC 22, and a CS bearer portion is established between the user element 16 and the media gateway 24 via the MSC 20. The session control signaling is sent directly to the RUA 30, which will essentially combine the session control signaling and the bearer control signaling to present unified session control signaling into the MS 14 on behalf of the user element 16. The unified session control signaling is presented to and received from the remote terminal 18 via the I/S-CSCF 26.

For unified signaling from the MS 14 intended for the user element 16, the session control signaling and the bearer control signaling from the MS 14 are separated from the unified signaling by the RUA 30 and sent to the CAAF 28 over the respective session control signaling and bearer control signaling paths. The CAAF 28 may then combine the session control signaling and the bearer control signaling when providing CS access signaling to the user element 16.

The CS call control channel between the user element 16 and the RUA 30 is supported over the CS access signaling path and the session control signaling path via CAAF 28. As noted above, the CS call control channel provides a signaling channel for session control signaling between the user element 16 and the RUA 30, when a portion of the bearer path for the call is provided by the CS 12. The CAAF 28 will function to recover the session control signaling from the CS access signaling and present it to the RUA 30, and vice versa. Details are provided further below.

Figure 2:
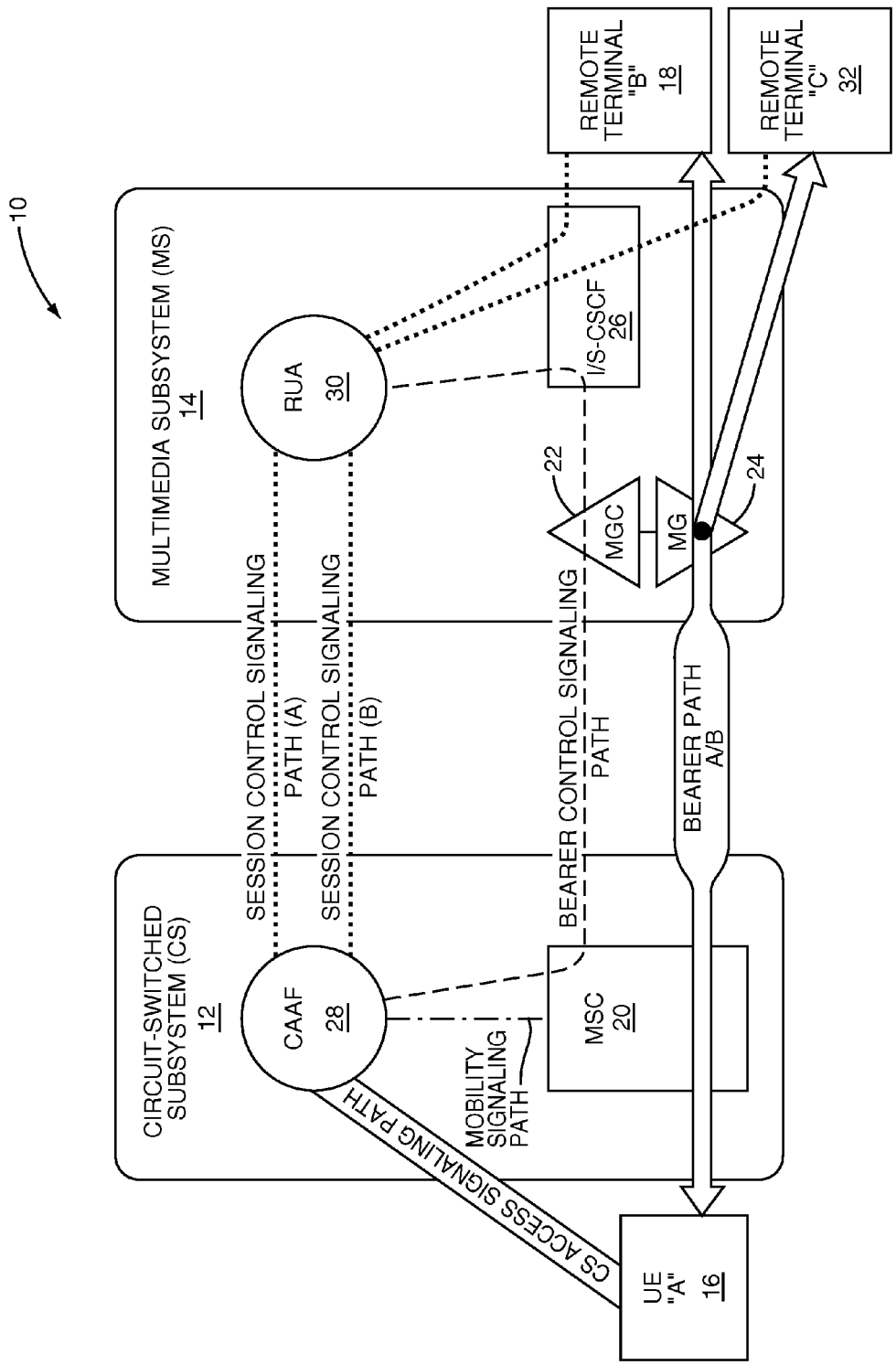
FIG. 2 is a communication environment according to a second embodiment of the present invention.

The bearer path and the respective signaling paths are representative of calls originated by, terminated by, and transferred to the user element 16. As illustrated in FIG. 2, the CS portion of the bearer path may be maintained from one call to another and used for multiple calls at any given time. The MS 14 will operate to establish packet bearer portions from the media gateway 24 to other remote terminals, such as the remote terminal 32, for the different calls. The media gateway 24 will connect the various packet bearer portions to the CS bearer portion to create one or more effective bearer paths. The calls are controlled by the MS 14 outside of the CS bearer portion of the bearer path and the bearer signaling path.

Although the CS bearer portion of the bearer path and the bearer signaling path may remain intact for different calls, different session control signaling paths for the different calls are established between the CAAF 28 and the RUA 30 to support different CS call control channels (A and B) between the user element 16 and the RUA 30. Within the MS 14, different calls will have different signaling.

The following communication flows are abbreviated for the purposes of conciseness and readability. Those skilled in the art should be able to review these communication flows and readily employ the concepts of the present invention in a SIP-based IMS environment or the like.

Figure 3:
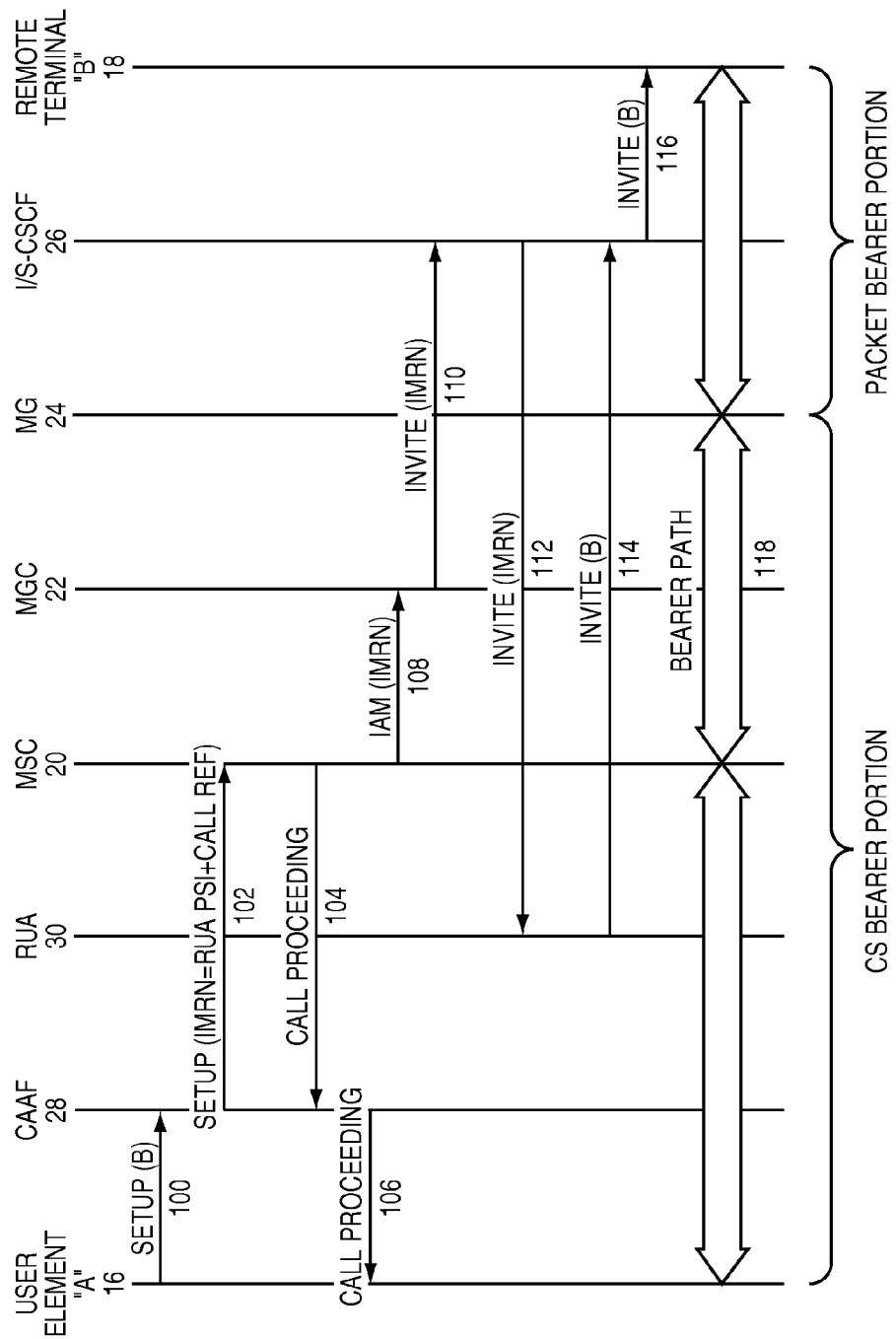
FIG. 3 is a communication flow diagram illustrating call establishment from a first user element to a second user element according to the first embodiment of the present invention.

With reference to FIG. 3, a communication flow is illustrated for initiating a call from user element 16 to remote terminal 18, wherein user element 16 is supported by the CS 12, and call control is provided by the MS 14. Initially, the user element 16 initiates a call to remote terminal 18, which is referenced with an address or directory number "B." User element 16 initiates the call by sending a Setup message toward the MSC 20 indicating that a call is being initiated to the remote terminal 18 (B) (step 100). Prior to reaching the MSC 20, the CAAF 28 will intercept the Setup message and instruct the MSC 20 to initiate a call from the user element 16 to the RUA 30 in the MS 14. In particular, the CAAF 28 will use a Public Service Identity (PSI) for the RUA 30 and generate call reference information (CALL REF), which includes information identifying the call as well as identifying the remote terminal 18 (B). The PSI of the RUA 30 and the call reference information is used to create an IP Multimedia Routing Number (IMRN), which is sent by the CAAF 28 to the MSC 20 (step 102). In response, the MSC 20 will send a Call Proceeding message back to the CAAF 28 (step 104), which will forward the Call Proceeding message to the user element 16 (step 106) to indicate that the MSC 20 is processing the call. At this point, a CS portion of the bearer path is established between the user element 16 and the MSC 20.

Based on the IMRN, the MSC 20 will determine that the call should be routed to the MGC 22, which corresponds to the RUA 30 of the MS 14. As such, the MSC 20 will send an Integrated User Services Part (ISUP) Initial Address Message (IAM) with the IMRN to the MGC 22 (step 108), which will process the IAM and generate an Invite message including the IMRN to be sent toward the RUA 30. At this point, another CS portion of the bearer path is established between the MSC 20 and the media gateway 24 under the control of the MGC 22. The MGC 22 will forward the Invite message to the I/S-CSCF 26 (step 110), which will forward the Invite message to the RUA 30 (step 112). The RUA 30 represents the user element 16 to the MS 14, and will process the call reference information of the IMRN to determine that the call is intended for the remote terminal 18 (B). As such, the RUA 30 will send an Invite message intended for the remote terminal 18 to the I/S-CSCF 26 (step 114), which will forward the Invite message to the remote terminal 18 (step 116). A packet-based portion of the bearer path is now established between the media gateway 24 and the remote terminal 18. The overall bearer path is established between the user element 16 and the remote terminal 18 via the MSC 20 and the media gateway 24 (step 118).

From the above, the CAAF 28 is used to intercept and process signaling from the user element 16 and instruct the MSC 20 to route the call toward the RUA 30. This action results in a CS portion of the bearer path being established between the user element 16 and the media gateway 24 via the MSC 20. When the call is presented to the RUA 30, the RUA 30 will act on behalf of the user element 16 to establish a packet-based portion of the bearer path between the media gateway 24 and the remote terminal 18. The media gateway 24 will effectively interwork the circuit-switched portion and the packet-based portion of the bearer path to facilitate communications between the user element 16 and the remote terminal 18.

Figure 4:
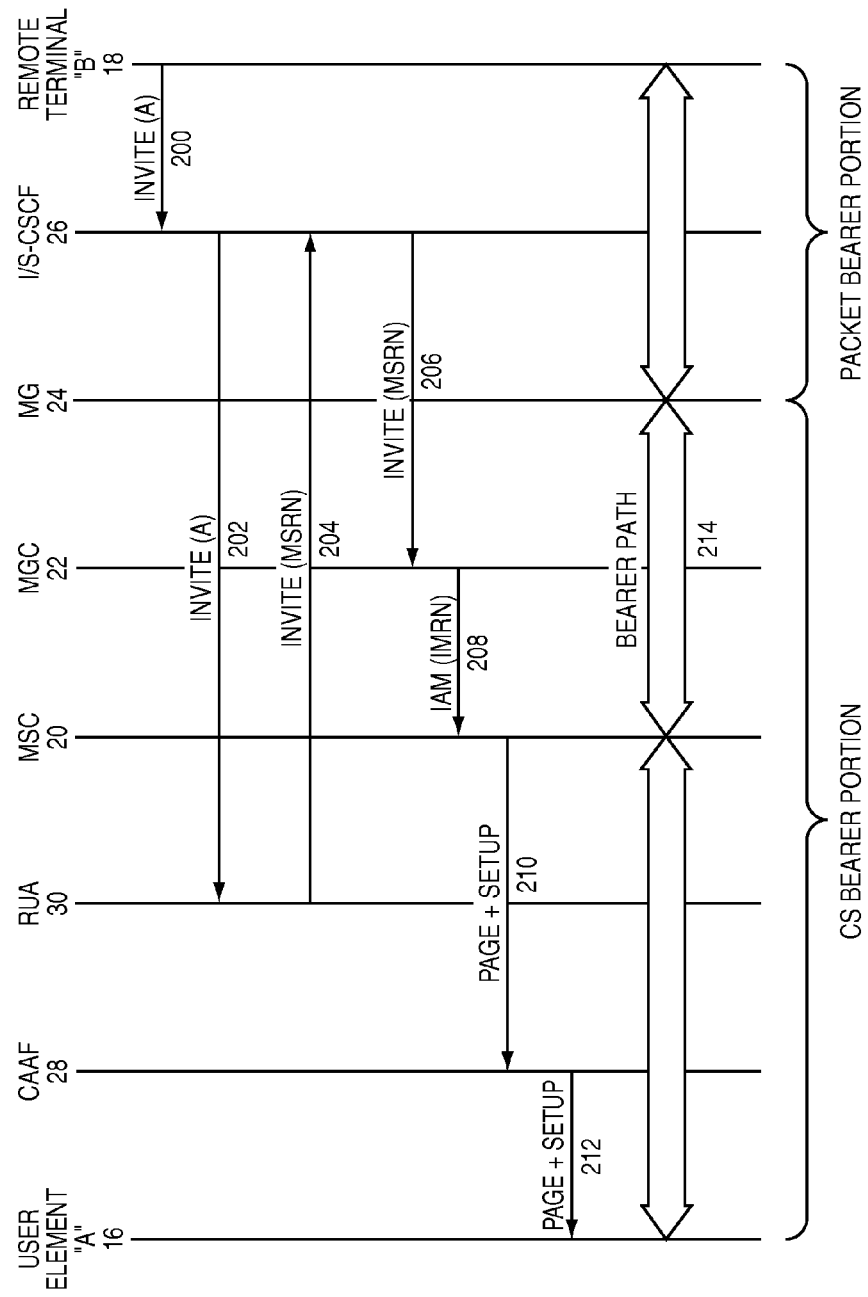
FIG. 4 is a communication flow diagram illustrating call establishment from the second user element to the first user element according to the first embodiment of the present invention.

Turning now to FIG. 4, a communication flow is provided to illustrate user element 16 receiving a call originated from remote terminal 18. Again, the user element 16 is supported by the CS 12, and a portion of the bearer path will be a circuit-switched portion within the CS 12. Initially, the remote terminal 18 will initiate an Invite message toward user element 16, which is associated with an address or directory number "A." The Invite message is received by the I/S-CSCF 26 (step 200), and forwarded to the RUA 30, which represents the user element 16 in the MS 14 (step 202). The RUA 30 will generate a Mobile Subscriber Routing Number (MSRN), which is essentially a routing number for routing calls to the user element 16 within the CS 12. In particular, the MSRN will direct the call to the user element 16 via the MGC 22 and the MSC 20. As such, the RUA 30 will forward the Invite message with the MSRN to the I/S-CSCF 26 (step 204), which will forward the Invite to the MGC 22 (step 206). The MGC 22 will generate a corresponding IAM and forward the IAM with the MSRN to the MSC 20, which is supporting the user element 16 in the CS 12 (step 208). The MSC 20 will send the traditional Page and Setup messages toward the user element 16. These messages will be received by the CAAF 28 (step 210), which will process the messages and present them to the user element 16 (step 212).

Based on the above signaling, a bearer path is established between the user element 16 and the remote terminal 18 (step 214). A packet-based portion of the bearer path is established between the media gateway 24, which is associated with the MGC 22, and the remote terminal 18. The CS portion of the bearer path is established between the user element 16 and the media gateway 24 via the MSC 20.

Figure 5:
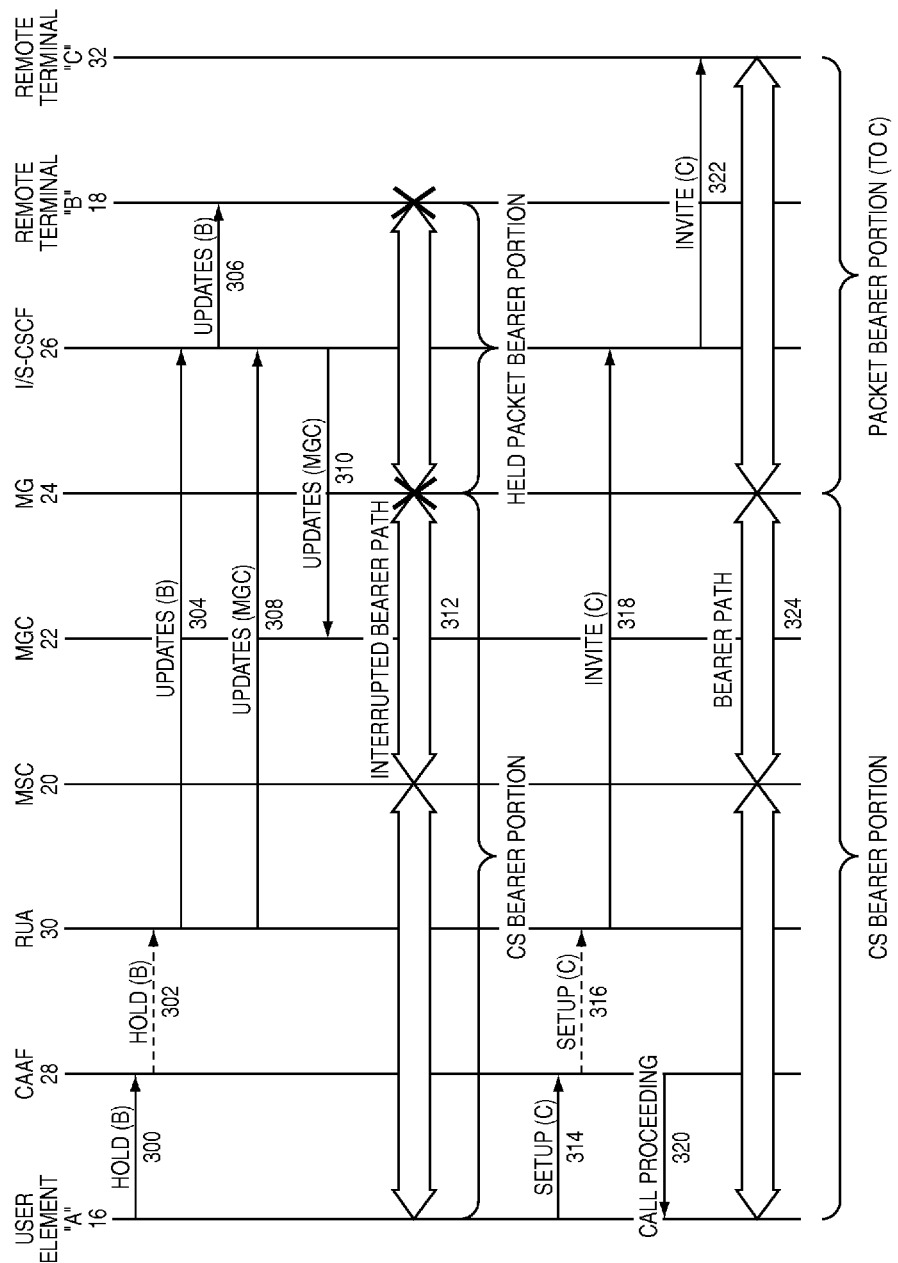
FIG. 5 is a communication flow wherein a first call is held and a second call is initiated according to the first embodiment of the present invention.

As indicated above, a CS call control channel may be employed to allow the user element 16 and the RUA 30 to exchange session control signaling. With reference to FIG. 5, a communication flow is provided to illustrate such control. The example relates to having user element 16 (A) place a call established with remote terminal 18 (B) on hold, and then having the user element 16 initiate a call to the remote terminal 32 (C). Assume the call being placed on hold was established according to either the scenario presented in FIG. 2 or the scenario presented in FIG. 3.

Initially, the user element 16 will receive input from the user to place the existing call with the remote terminal 18 (B) on hold. The user element 16 will respond by sending the normal Hold message, which is normally presented to the MSC 20 to hold an existing call. Instead of the Hold message being presented to the MSC 20, the Hold message is intercepted by the CAAF 28 (step 300). The CAAF 28 will not send the Hold message to the MSC 20, but instead will process the Hold message in a format recognizable by the RUA 30 and provide the resulting Hold message to the RUA 30 via the session control signaling path (step 302). The vehicle for delivering the Hold message from the user element 16 to the RUA 30 via the CAAF 28 represents the CS call control channel, wherein the CAAF 28 provides the requisite translation to allow the RUA 30 to recognize messages provided by the user element 16.

In response to receiving the Hold message for the call to the remote terminal 18 (B), the RUA 30 will send session updates for the remote terminal 18 (B) toward the I/S-CSCF 26 (step 304), which will forward the session updates to the remote terminal 18 (B) (step 306). The RUA 30 will also send session updates toward the MGC 22 via the I/S-CSCF 26 (steps 308 and 310). The remote terminal 18 will recognize that the call with the user element 16 (A) has been placed on hold, which will result in the packet-based portion of the bearer path being held. Placing the packet-based portion of the bearer path on hold interrupts the overall bearer path between the user element 16 and the remote terminal 18; however, the CS portion of the bearer path will remain intact.

At this point, the call between the user element 16 (A) and the remote terminal 18 (B) is on hold, and the circuit-switched portion of the bearer path remains active between the user element 16 and the media gateway 24. To initiate a call to the remote terminal 32 (C), the user element 16 will again send a Setup message intended for the MSC 20. The CAAF 28 will intercept the Setup message identifying the remote terminal 32 (C) as the destination for the call (step 314), and will send an appropriately configured Setup message to the RUA 30 (step 316), instead of relaying the Setup message to the MSC 20. Since the CS portion of the bearer path is intact from the earlier call to the remote terminal 18 (B), there is no need to set up another CS portion for the bearer path to be established with the remote terminal 32 (C). As such, signaling to the MSC 20 is not necessary, and only session control signaling is required via the CS call control channel between the user element 16 and the RUA 30.

Upon receipt of the Setup message for the call to the remote terminal 32 (C), the RUA 30 will generate an Invite message and send it toward the remote terminal 32 (C). Meanwhile, the CAAF 28 will generate a Call Proceeding message and send it back to the user element 16 to indicate that the call is proceeding accordingly (step 320). The Invite message from the RUA 30 is received by the I/S-CSCF 26 (step 318) and forwarded to the remote terminal 32 (C) (step 322). The Invite message will effectively instruct the remote terminal 32 (C) to establish a session with the media gateway 24 for the packet-based portion of the bearer path between the user element 16 (A) and the remote terminal 32 (C). The media gateway 24 will interwork the CS and packet-based bearer portions of the bearer path to create an overall bearer path between the user element 16 (A) and the remote terminal 32 (C) (step 324).

Figure 6:
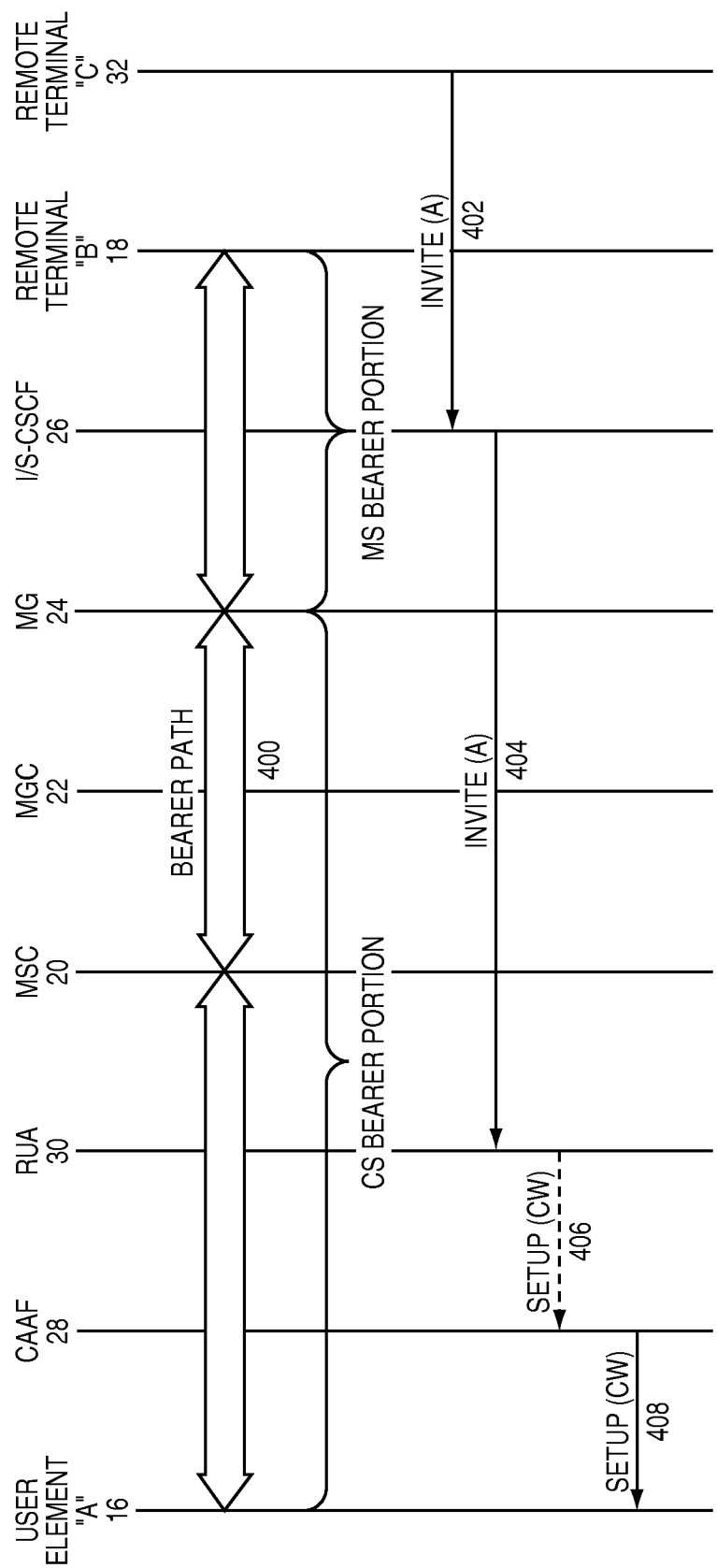
FIG. 6 is a communication flow illustrating receiving a second call while engaged in a first call according to the first embodiment of the present invention.

With reference to FIG. 6, a communication flow is provided to illustrate a call being initiated from remote terminal 32 (C) to user element 16 (A) while user element 16 (A) and remote terminal 18 (B) are engaged in a call having an established bearer path (step 400). Assume the call is established according to one of the above scenarios, wherein a CS portion of the bearer path is established between the user element 16 and the media gateway 24 via the MSC 20. The MS portion of the bearer path is established between the media gateway 24 and the remote terminal 18 (B). For the remote terminal 32 (C) to initiate a call to the user element 16 (A), the remote terminal 32 must send an Invite message identifying user element 16 (A) to the I/S-CSCF 26 (step 402), which will forward the Invite message to the RUA 30 (step 404), which is representing user element 16 (A) in the MS 14. The RUA 30 will use the CS call control channel to send a Setup message to present the call to the user element 16. In particular, the Setup message is sent to the CAAF 28 with call waiting (CW) information identifying the remote terminal 32 (C) (step 406). The CAAF 28 will translate the Setup message to an appropriate Setup message for the user element 16, and deliver the Setup message with the call waiting information to the user element 16 (step 408). At this point, the user element 16 may recognize the incoming call and process the call waiting information in traditional fashion. Notably, the Setup message provided by the CAAF 28 to the user element 16 will appear to user element 16 as if it were received from the MSC 20 in traditional fashion. If the user elects to answer the call, the CS bearer portion for the bearer path between the user element 16 (A) and the remote terminal 32 (C) is the same as that for the bearer path between user element 16 (A) and the remote terminal 18 (B).

Figure 7:
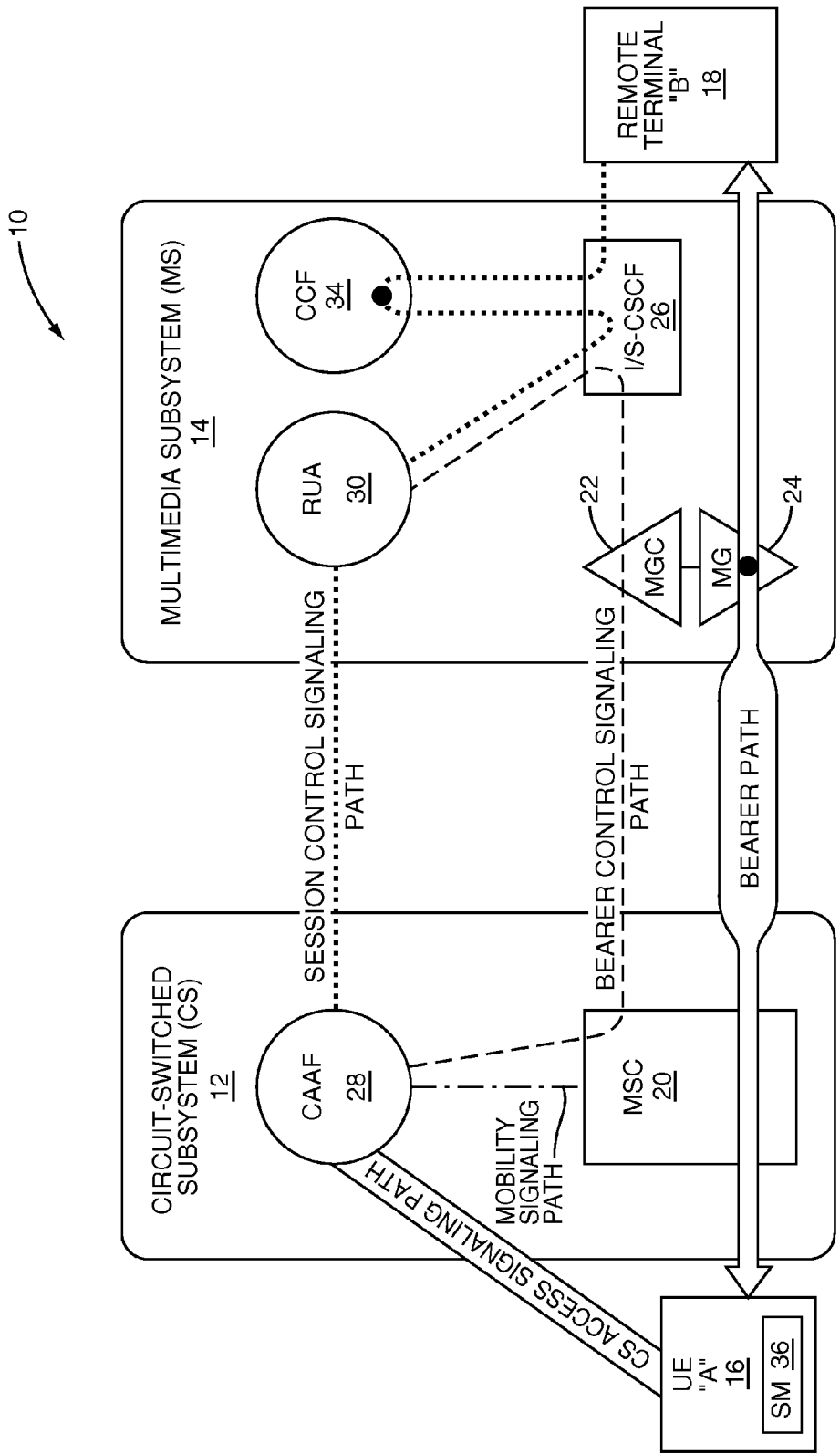
FIG. 7 is a communication environment according to a third embodiment of the present invention.

The above embodiments are generally applicable to the user element 16, which is not aware of the presence of the MS 14 or the fact that the MS 14 is controlling calls to and from the user element 16. With reference to FIG. 7, a more sophisticated user element 16 is provided. The user element 16 functions to provide call control in the MS 14. In particular, the user element 16 is capable of providing SIP-based call control, wherein the user element 16 will effectively send and receive SIP messages through various entities in the MS 14 via the CS call control channel provided through the CAAF 28 and the RUA 30. The RUA 30 represents the user element 16 to the multimedia subsystem 14, and relays messages back and forth with the user element 16. The user element 16 will also maintain a state machine (SM) 36 to keep track of state information associated with any sessions being controlled by the user element 16. The state machine information may indicate whether the sessions are active, held, or part of a conference call, as well as identifying parties to a session and the respective addresses for those parties. Maintaining the state information is particularly beneficial when the user element 16 transfers from the CS 12 to a PS, where neither the bearer path nor the control signaling are maintained within the CS 12, and vice versa.

In the illustrated embodiment, a call control function (CCF) 34 is used to anchor session signaling to facilitate service continuity during domain transfers. Details are available in common owned and assigned U.S. application Ser. No. 11/378,776 filed Mar. 17, 2006, which is incorporated herein by reference in its entirety. As illustrated, the CCF 34 remains in the session control signaling path and anchors a remote access signaling leg between the CCF 34 and the remote terminal 18, as well as a local access signaling path toward the user element 16. Additional details are provided below.

Figure 8:
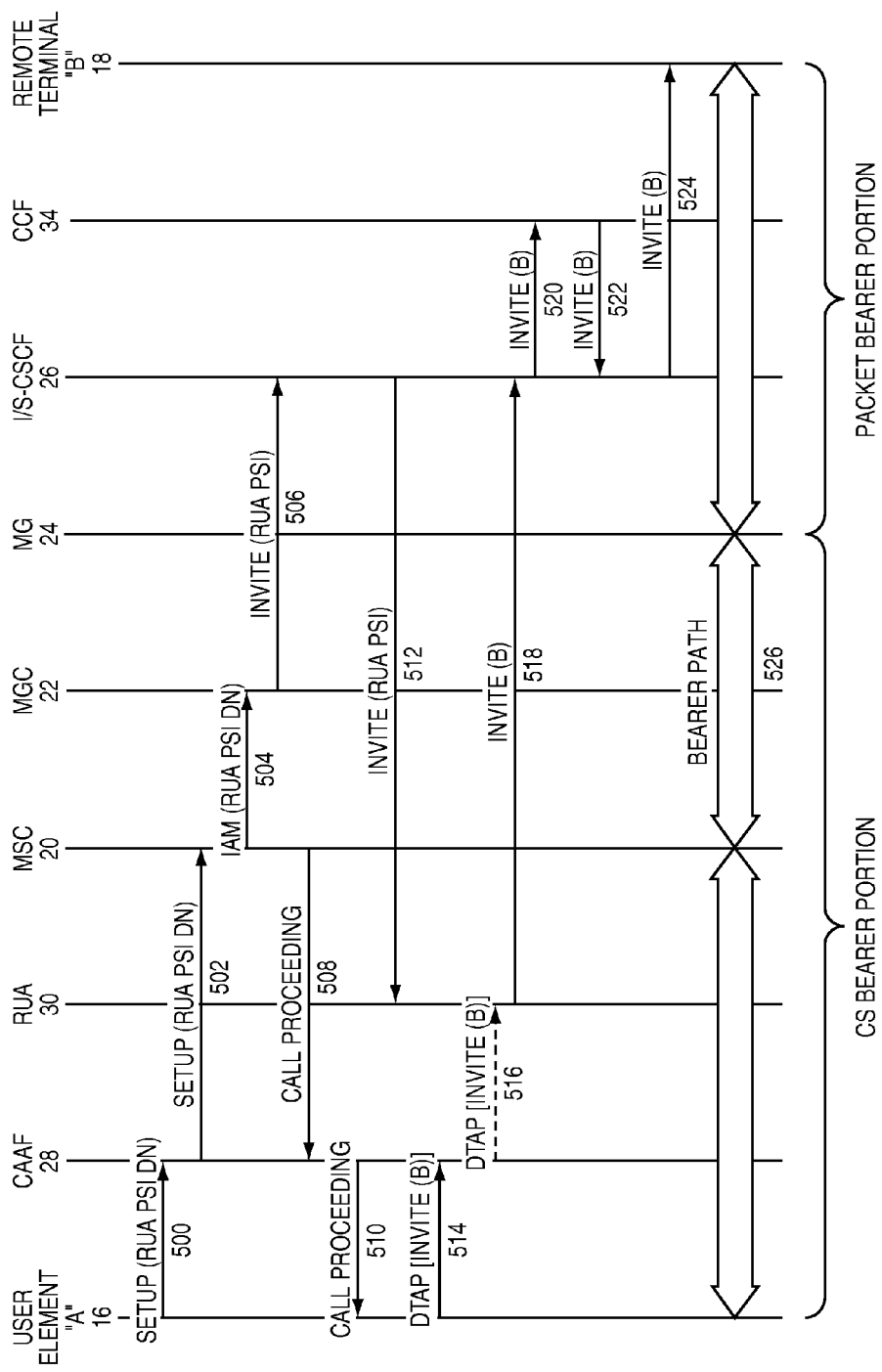
FIG. 8 is a communication flow illustrating initiating a call when SIP call control is provided by a user element according to the third embodiment of the present invention.

With reference to FIG. 8, a communication flow is provided to illustrate user element 16 initiating a call to remote terminal 18 (B). Again, session control is provided by the user element 16, and the CS call control channel is used to exchange SIP messages between the user element 16 and the RUA 30. The process begins when the user element 16 sends a Setup message to initiate a call in response to a user electing to initiate a call to remote terminal 18. Instead of directing the Setup message to the remote terminal 18, the user element 16 will initially direct the call to the RUA 30 using the PSI directory number for the RUA 30. The Setup message is sent to the CAAF 28 (step 500), which will send the Setup message to the MSC 20 to route the call toward the RUA 30 (step 502). The Setup message will trigger establishment of a connection through the CS 12 between the user element 16 and the MSC 20. This connection will be part of the CS portion of the bearer path.

The MSC 20 will respond to the Setup message by forwarding an IAM toward the PSI directory number for the RUA 30. The PSI directory number for the RUA 30 will direct the IAM to the MGC 22 (step 504), which will send a corresponding Invite message through the MS 14 to the I/S-CSCF 26 (step 506). The MSC 20 will respond to the Setup message by providing a Call Proceeding message back to the CAAF 28 (step 508), which will forward the Call Proceeding message to the user element 16 (step 510). The I/S-CSCF 26 will forward the Invite message to the RUA 30 using the PSI associated with the RUA 30 (step 512). The IAM will trigger the initiation of a connection between the MSC 20 and the media gateway 24 to create the second part of the CS portion of the bearer path. As illustrated, the RUA PSI directory number is the directory number associated with the MGC 22, which is serving the RUA 30. The RUA PSI is the address in the MS 14 corresponding to the RUA 30.

While the call is being routed to the RUA 30 via the CS 12, the user element 16 will take the necessary steps to initiate a session to the remote terminal 18 (B). In this example, the user element 16 will generate a SIP Invite message sufficient to trigger the RUA 30 to send an Invite on behalf of the user element 16 to the remote terminal 18. As such, the SIP Invite message may be embedded in a Direct Transfer Application Part (DTAP) message or the like in an appropriate template, and sent out as CS access signaling. The DTAP message with the embedded Invite message is intercepted by the CAAF 28 (step 514), which will forward the Invite message to the RUA 30 (step 516). The RUA 30 will recover the Invite message provided by the CAAF 28 and associate it with the Invite message received via the CS 12. An appropriate Invite message intended for the remote terminal 18 (B) is then sent by the RUA 30 to the I/S-CSCF 26 (step 518), which will forward the Invite message to the CCF 34 (step 520). The CCF 34 will send the Invite message back to the I/S-CSCF 26 (step 522). The CCF 34 is employed for call anchoring, as will be discussed further below. The I/S-CSCF 26 will then forward the Invite message toward the remote terminal 18 (step 524). At this point, a packet-based portion of the bearer path is established between the media gateway 24 and the remote terminal 18 (B). Again, a bearer path is created from the CS portion of the bearer path between the user element 16 and the media gateway 24 via the MSC 20, and the packet-based portion of the bearer path between the media gateway 24 and the remote terminal 18 (step 526).

Figure 9:
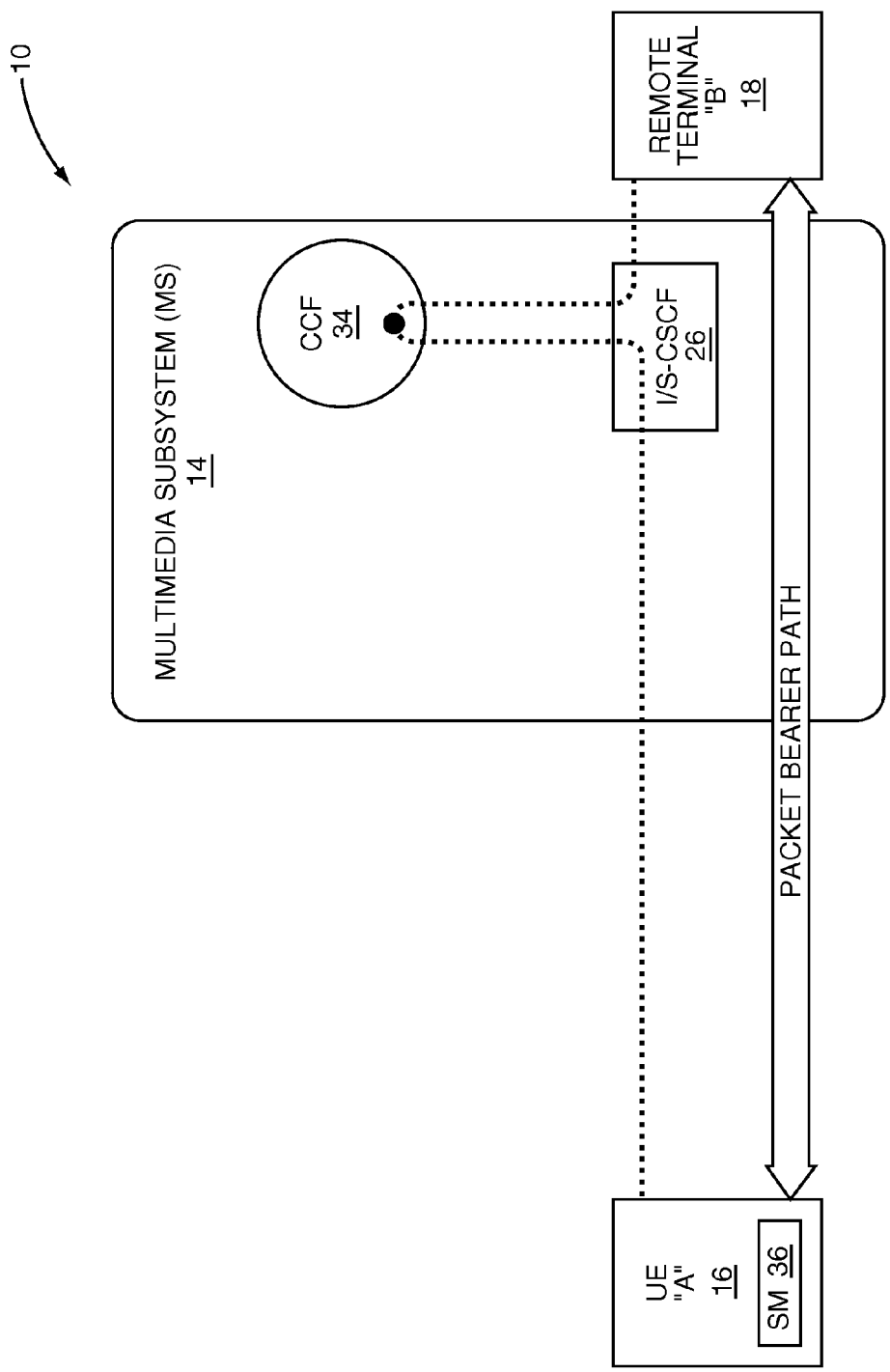
FIG. 9 is a communication environment according to a fourth embodiment of the present invention.

When call control is provided by the user element 16 and the CCF 34 is employed for call anchoring, the user element 16 may transfer from the CS 12 to a PS associated with the MS 14 and maintain active sessions across the domain transfer. FIG. 9 illustrates the call signaling and packet bearer path when the user element 16 is supported by a PS of the MS 14. As illustrated, the CS 12 is not employed, and the session control signaling (dashed line) passes from the user element 16 into the I/S-CSCF 26, to the CCF 34, back through the I/S-CSCF 26, and toward the remote terminal 18. The packet bearer path is supported solely within the PS, and the user element 16 maintains the state machine 36 in association with providing call control in the MS 14. FIG. 9 represents a transfer from the CS 12 to the PS for the user element 16. Similarly, FIG. 7 may represent a transfer from the PS to the CS 12 for the user element 16. Notably, the session signaling illustrated in FIG. 9 is not routed through the RUA 30 when the call is supported by the PS instead of the CS 12.

Figure 10:
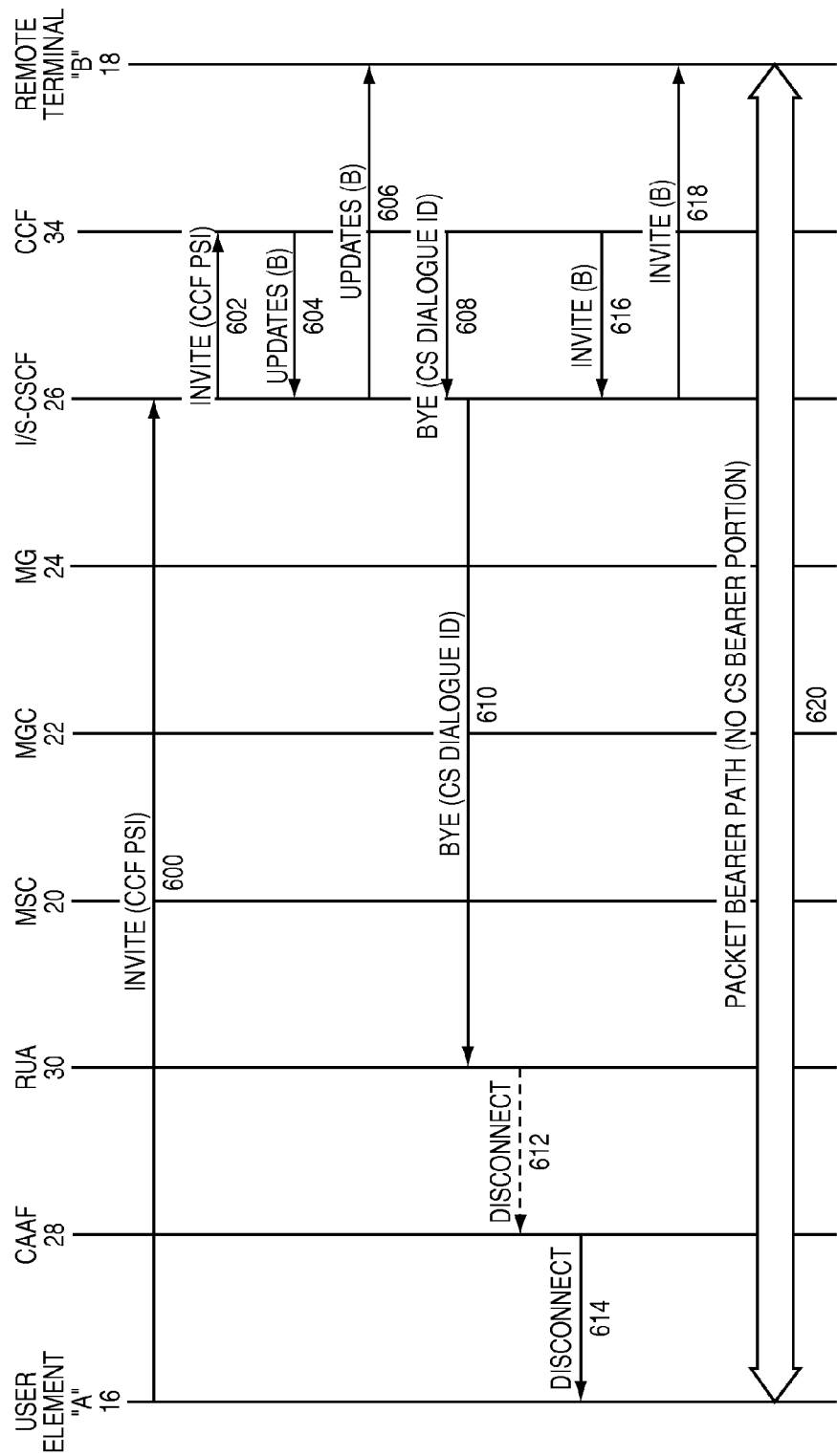
FIG. 10 is a communication flow illustrating a domain transfer to a packet subsystem associated with a multimedia subsystem, wherein SIP call control is provided in the user element according to the third embodiment of the present invention.

FIG. 10 provides a communication flow for a domain transfer for the user element 16 from the CS 12, as illustrated in FIG. 7, to the PS, as illustrated in FIG. 9. Call control is provided in the user element 16. Assume that a call exists between the user terminal 16 (A) and the remote terminal 18 (B), as described in association with FIG. 8. To initiate the transfer to the PS from the CS 12, the user element 16 (A) will send an Invite message via the MS 14 toward the CCF 34 using a PSI associated with the CCF 34. The CCF PSI provides sufficient addressing to route the Invite message to the CCF 34, as well as to tell the CCF 34 that a transfer request is being made. The Invite message is initially sent to the I/S-CSCF 26 (step 600), which will forward the Invite message to the CCF 34 (step 602). When the CCF 34 receives the Invite message, it will recognize that the user element 16 (A) is requesting a transfer from the CS 12 to the PS, which is fully supported by the MS 14. The CCF 34 will provide session updates to the remote terminal 18 (B) via the I/S-CSCF 26 (steps 604 and 606). The session updates are sufficient to alert the remote terminal 18 (B) that a transfer is pending, and may provide the communication parameters necessary for communicating with the user element 16 (A) via the PS instead of via the media gateway 24.

The CCF 34 may take the necessary steps to end the CS portion of the bearer path and associated signaling by sending a Bye message to the RUA 30 via the I/S-CSCF 26 (steps 608 and 610). The Bye message may provide a CS dialogue ID to identify the CS portion of the call. The RUA 30 will process this information, and may use the CS call control channel to instruct the user element 16 to disconnect from the CS leg of the call and begin communicating via the PS portion of the call. Accordingly, the RUA 30 may send a Disconnect message to the CAAF 28 (step 612), which will process the Disconnect message received from the RUA 30 and provide an appropriately formatted Disconnect message to the user element 16 (step 614).

Meanwhile, the CCF 34 will forward an Invite message toward the remote terminal 18 via the I/S-CSCF 26 to initiate the PS session between the user element 16 (A) and the remote terminal 18 (B) (steps 616 and 618). As a result, a packet bearer path, which does not traverse the CS 12, is established between the user element 16 (A) and the remote terminal 18 (B) (step 620).

Figure 11:
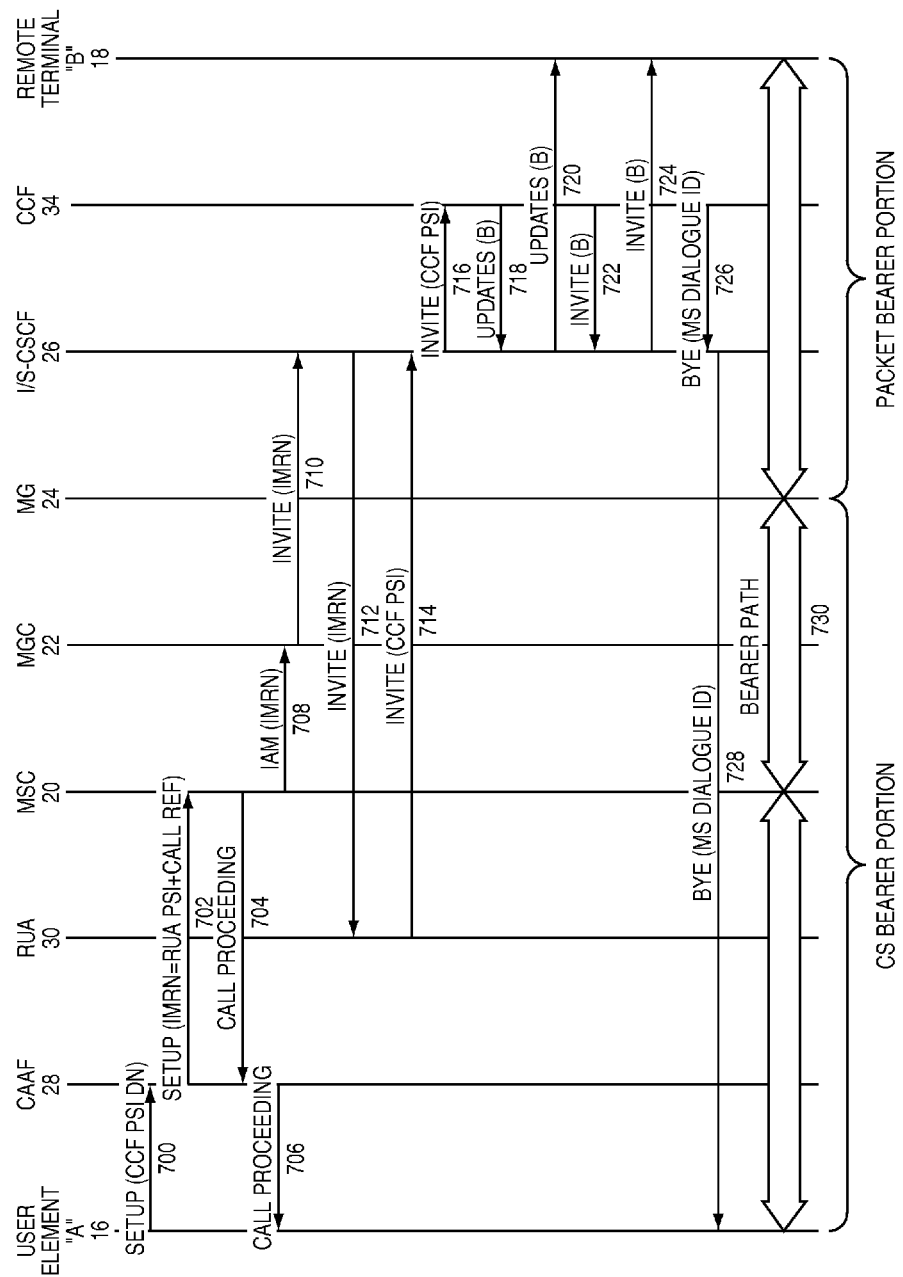
FIG. 11 is a communication flow illustrating a domain transfer to a circuit-switched subsystem, wherein SIP call control is provided in the user element according to the third embodiment of the present invention.

FIG. 11 provides a communication flow illustrating a transfer back to the CS 12 from the PS. Initially, the user element 16 (A) will recognize the need for a transfer and create a Setup message to initiate a call to the CCF 34 using the PSI directory number for the CCF 34. The Setup message is intercepted by the CAAF 28 (step 700), which will generate a Setup message sufficient to instruct the MSC 20 to route the call into the MS 14 via the MGC 22. The call is routed to the RUA 30 using an IMRN created from the PSI associated with the RUA 30 and call reference information, which will include the CCF PSI. Once the Setup message is received by the MSC 20 (step 702), a Call Proceeding message is sent back to the user element 16 (A) via the CAAF 28 (steps 704 and 706). Additionally, the MSC 20 will send an IAM with the IMRN to the MGC 22 (step 708). At this point, the CS portion of the bearer path is established between the user element 16 and the media gateway 24 via the MSC 20.

Upon receipt of the IAM, the MGC 22 will create a corresponding Invite message to route the call toward the RUA 30 using the IMRN. The Invite is sent to the I/S-CSCF 26 (step 710), which will forward the Invite message to the RUA 30 (step 712). The RUA 30 will process the IMRN to recover the CCF PSI, and forward an Invite message with the CCF PSI toward the CCF 34 via the I/S-CSCF 26 to initiate the transfer (steps 714 and 716). The CCF 34 will detect that the Invite message is a request to transfer the session to the CS 12, and as such, the CCF 34 will send session updates to the remote terminal 18 (B) via the I/S-CSCF 26 to alert the remote terminal 18 that user element 16 (A) is transferring from the PS to the CS 12 (steps 718 and 720). The CCF 34 may then send an Invite message toward the remote terminal 18 (B) via the I/S-CSCF 26 to initiate the packet-based portion of the bearer path between the media gateway 24 and the remote terminal 18 (B) (steps 722 and 724). The CCF 34 may also end the packet-based bearer path that was supporting the call through the PS by sending a Bye message with an MS dialogue ID toward the user element 16 (A) via the I/S-CSCF 26 through the MS 14 (steps 726 and 728). The MS dialogue ID is used to identify the call being released. Alternatively, the user element 16 (A) could initiate release of the packet-based leg of the bearer path. At this point, a bearer path is established between the user element 16 (A) and the remote terminal 18 (B), wherein a CS portion of the bearer path is established between the user element 16 and the media gateway 24 via the MSC 20, and the packet-based portion of the bearer path is established between the media gateway 24 and the remote terminal 18 (step 730). Throughout these domain transfers, the state machine 36, which keeps track of the state of the active calls or sessions, is maintained to provide continuity.

Figure 12:
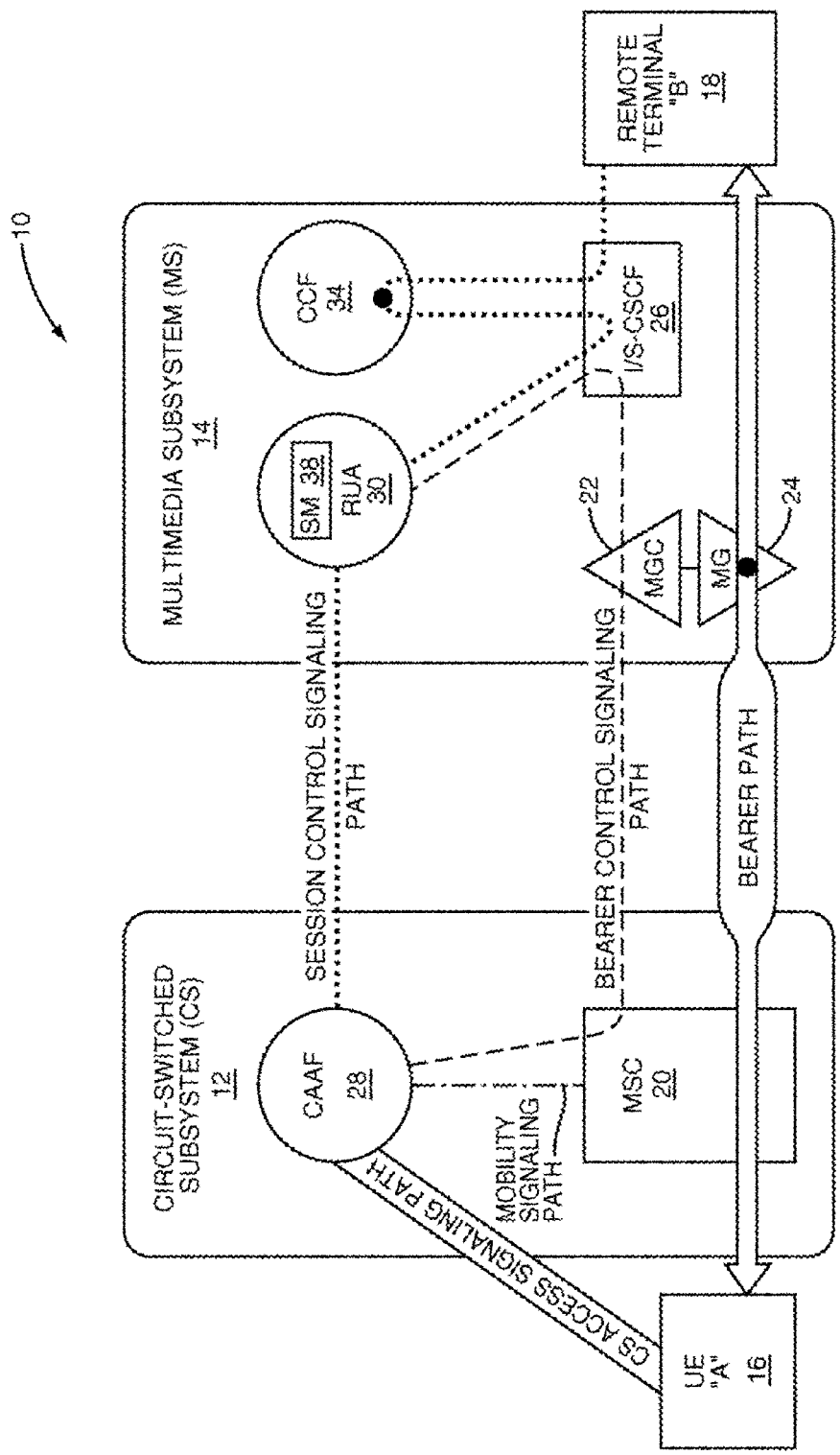
FIG. 12 is a communication environment according to a fifth embodiment of the present invention.

The previous embodiment employed SIP call control in the user element 16. As an alternative, SIP call control in the MS 14 may be provided on behalf of the user element 16 by the RUA 30, as provided in FIG. 12. Since the SIP call control is provided by the RUA 30, the RUA 30 may also keep track of the service data in a state machine 38 across domain transfers. Accordingly, the signaling between the user element 16 and the RUA 30 via the CAAF 28 over the CS call control channel is not SIP, and may take any form. In general, user input provided at the user element 16 is provided to the RUA 30 over the CS call control channel. The RUA 30 will process the user input and respond by delivering and appropriate SIP message over the MS 14.

Figure 13:
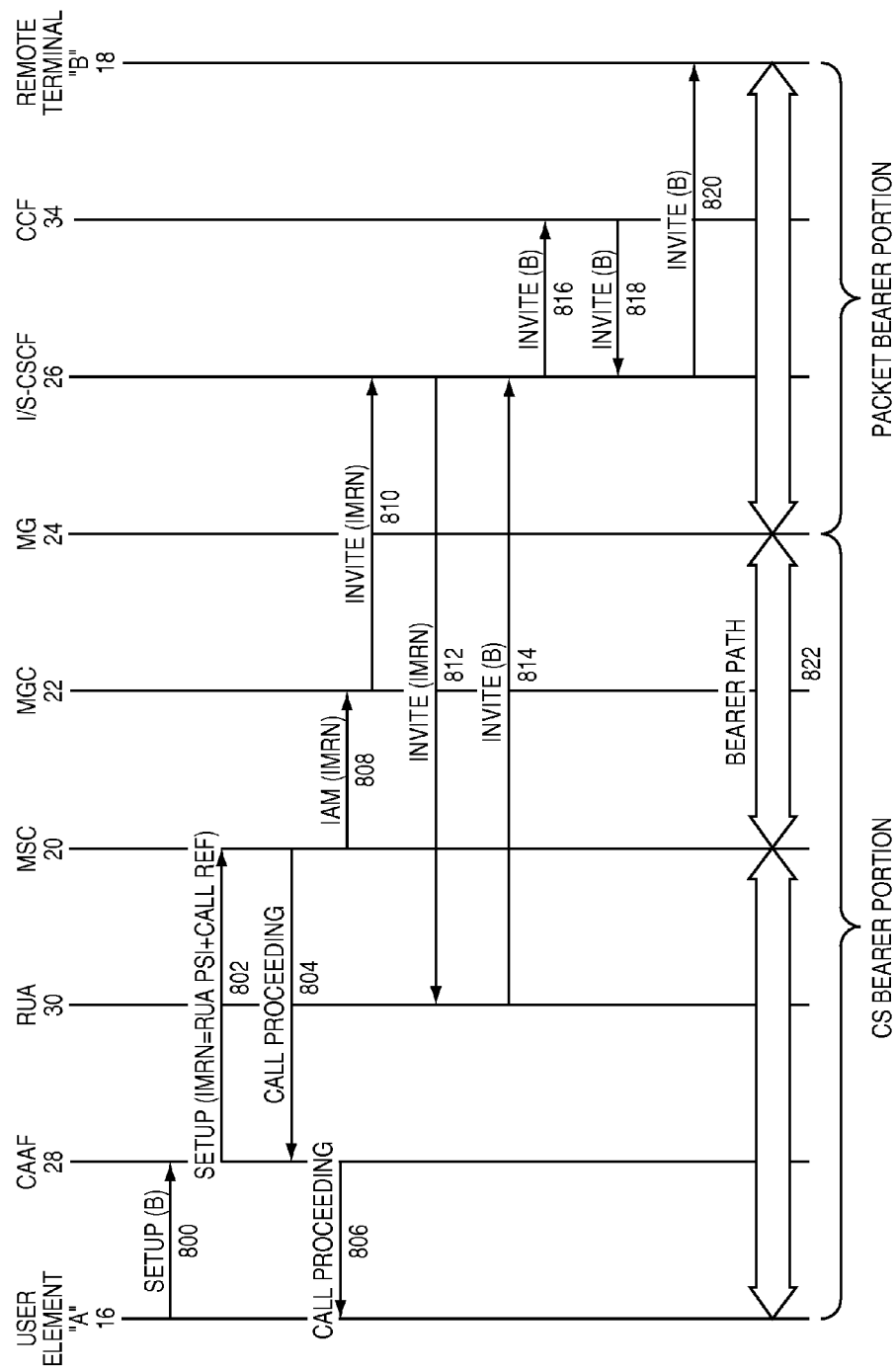
FIG. 13 is a communication flow illustrating initiating a call when SIP call control is provided by a remote user agent (RUA) according to the fifth embodiment of the present invention.

With reference to FIG. 13, a communication flow is provided wherein user element 16 (A) initiates a call to remote terminal 18 (B) and SIP call control is provided in the RUA 30. Initially, the user element 16 (A) will generate a Setup message to initiate a call to the remote terminal 18 (B). The CAAF 28 will intercept the Setup message (step 800) and create an IMRN sufficient to route the call into the MS 14 via the MSC 20. The IMRN will again provide the PSI for the RUA 30 and the call reference information, which will identify the remote terminal 18 (B). The Setup message is sent to the MSC 20 (step 802), which will respond by sending a Call Proceeding message toward the user element 16 via the CAAF 28 (steps 804 and 806). The MSC 20 will send an IAM to the MGC 22 (step 808), which will send an appropriate Invite message to the I/S-CSCF 26 (step 810). The I/S-CSCF 26 will forward the Invite message to the RUA 30 (step 812). At this point, the CS portion of the bearer path is established between the user element 16 (A) and the media gateway 24 via the MSC 20, and the call has been routed to the RUA 30. The RUA 30 will process the IMRN provided in the Invite message, and recognize that user element 16 (A) is attempting to initiate a call toward the remote terminal 18 (B).

As such, the RUA 30 will send an Invite message for the remote terminal 18 (B) to the I/S-CSCF 26 (step 814). The I/S-CSCF 26 will send the Invite message to the CCF 34 (step 816), which will process the Invite message as necessary and send the Invite message back to the I/S-CSCF 26 (step 818), which will then forward the Invite message to the remote terminal 18 (B) (step 820). At this point, the packet-based portion of the bearer path is established between the media gateway 24 and the remote terminal 18 (B). As such, the CS portion and the packet-based portion of the bearer path are connected by the media gateway 24 to provide the bearer path between the user element 16 and the remote terminal 18 (step 822).

Figure 14:
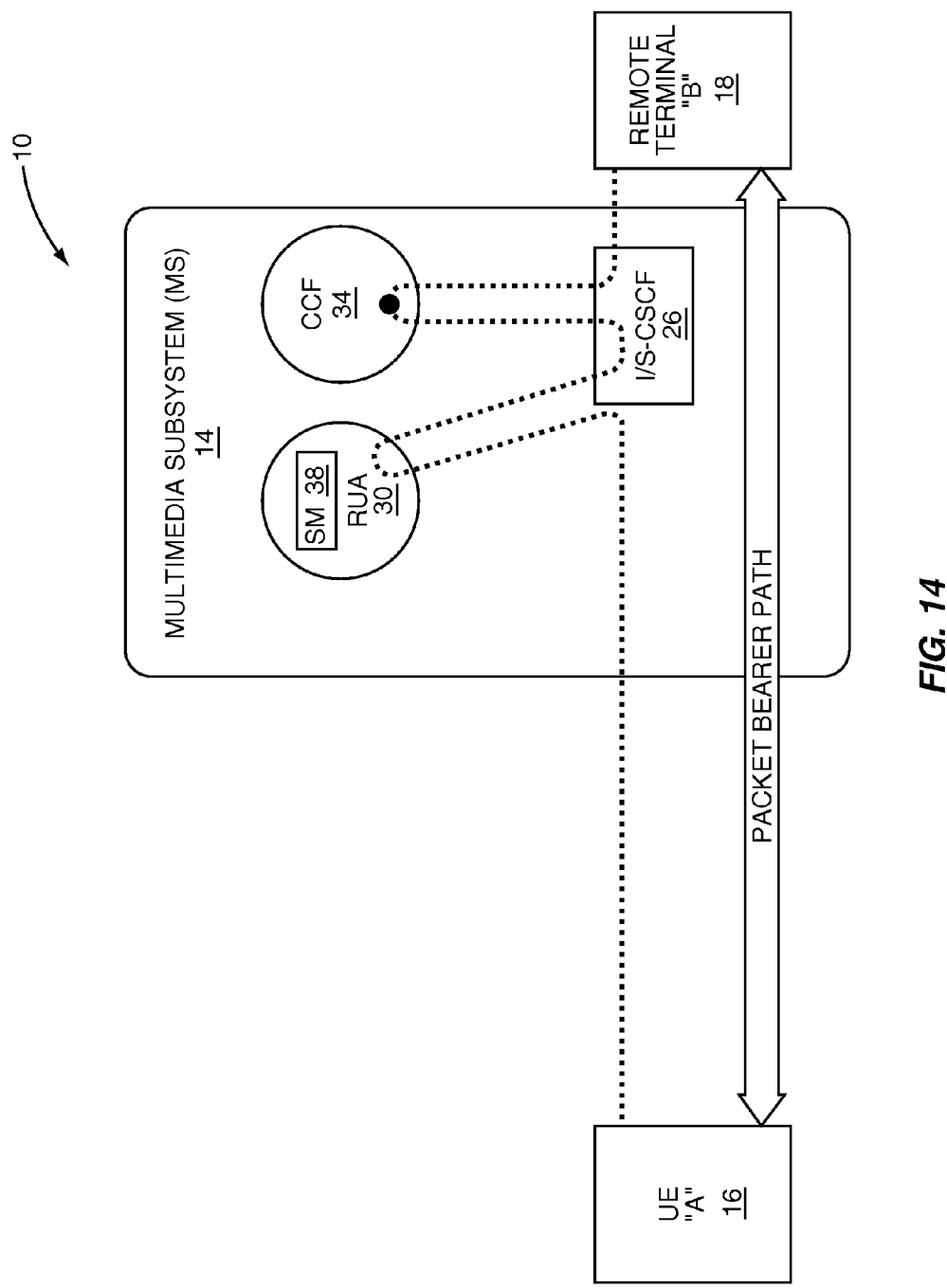
FIG. 14 is a communication environment according to a sixth embodiment of the present invention.

In this embodiment, the user element 16 is able to transfer from the CS 12 to the PS and vice versa. During these domain transfers, active sessions may be maintained. The sessions are anchored in the CCF 34. Further, the RUA 30 is maintained in the session signaling path across domain transfers. FIG. 14 represents the bearer path and the corresponding session signaling path when a call between the user element 16 and the remote terminal 18 is transferred to or established through the PS, without invoking the CS 12.

Figure 15:
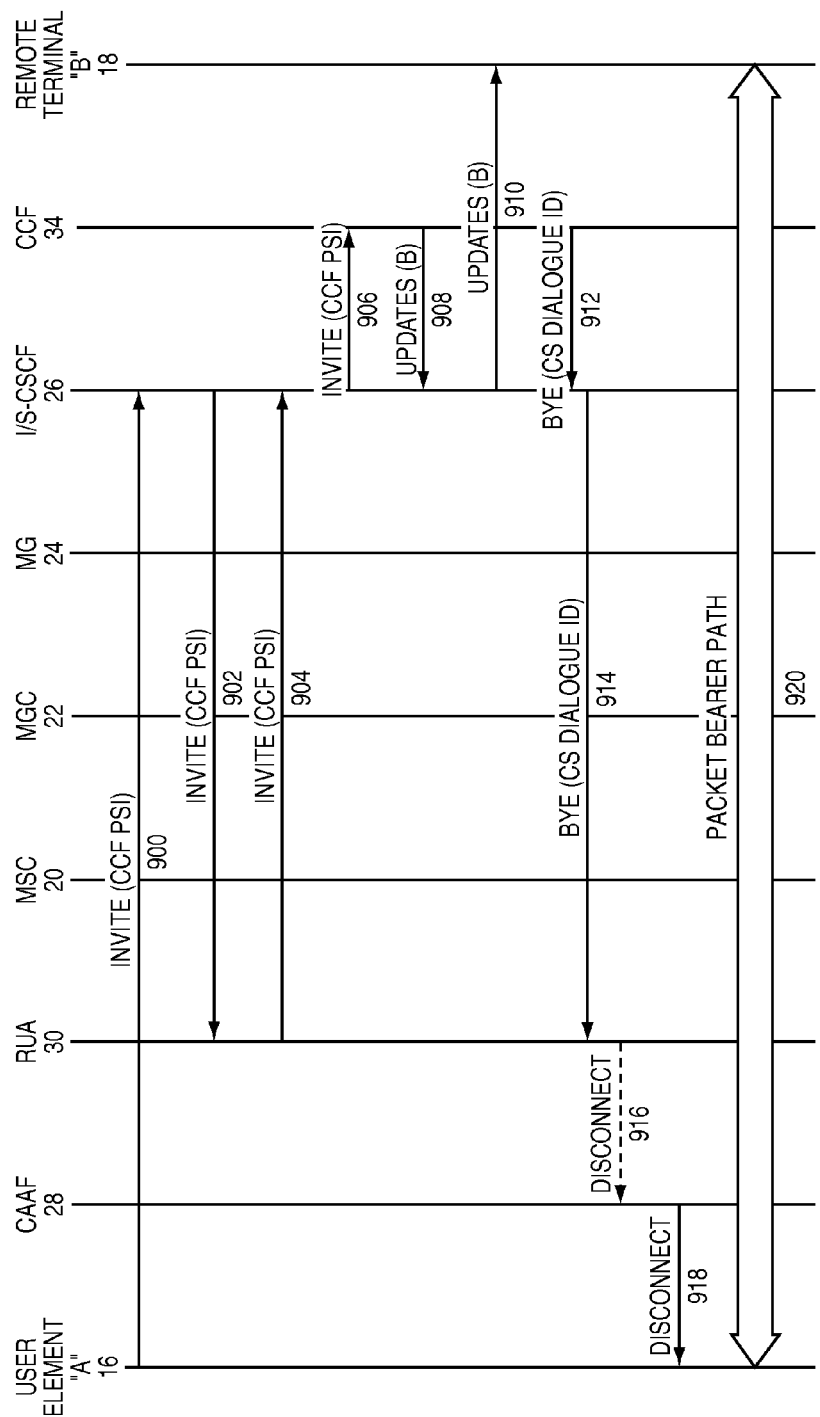
FIG. 15 is a communication flow illustrating a domain transfer to a packet subsystem associated with a multimedia subsystem, wherein SIP call control is provided in the RUA according to the fifth embodiment of the present invention.

With reference to FIG. 15, a domain transfer to the PS of the MS 14 is illustrated, wherein SIP call control is provided in the RUA 30. Initially, the user element 16 (A) will send an Invite message via the MS 14 toward the CCF 34 using the CCF PSI, which represents an instruction to transfer domains to the PS of the MS 14. The Invite message is sent to the I/S-CSCF 26 (step 900), which will forward the Invite message to the RUA 30 (step 902). The Invite message is routed to the RUA 30 because the RUA 30 is providing SIP call control, and is registered with the I/S-CSCF 26 as an application service that must be invoked for call signaling involving the user element 16 (A). The RUA 30 will recognize that the user element 16 is invoking transfer to the PS of the MS 14, and will forward the Invite message back to the I/S-CSCF 26 (step 904), which will forward the Invite message to the CCF 34, which is anchoring call signaling toward the remote terminal 18 (B) (step 906). The CCF 34 will recognize that the Invite message corresponds to a domain transfer to the PS of the MS 14, and will provide session updates to the remote terminal 18 (B) via the I/S-CSCF 26 (steps 908 and 910). The remote terminal 18 (B) will have sufficient information to establish communications with the user element 16 (A).

To tear down the old CS portion of the bearer path and the associated signaling, the CCF 34 may send a Bye message toward the RUA 30 via the I/S-CSCF 26 (steps 912 and 914). The Bye message will include a CS dialogue ID identifying the CS portion of the bearer path and the associated signaling. Again, the Bye message is sent to the RUA 30 because the RUA 30 represents the user element 16 to the MS 14 when the CS 12 is employed. The RUA 30 will then deliver a Disconnect message to the user element 16 (A) via the CAAF 28 using the CS call control channel (steps 916 and 918). At this point, the packet bearer path is established between the user element 16 (A) and the remote terminal 18 (B) (step 920). The old bearer path, which included a CS portion, is released.

Figure 16:
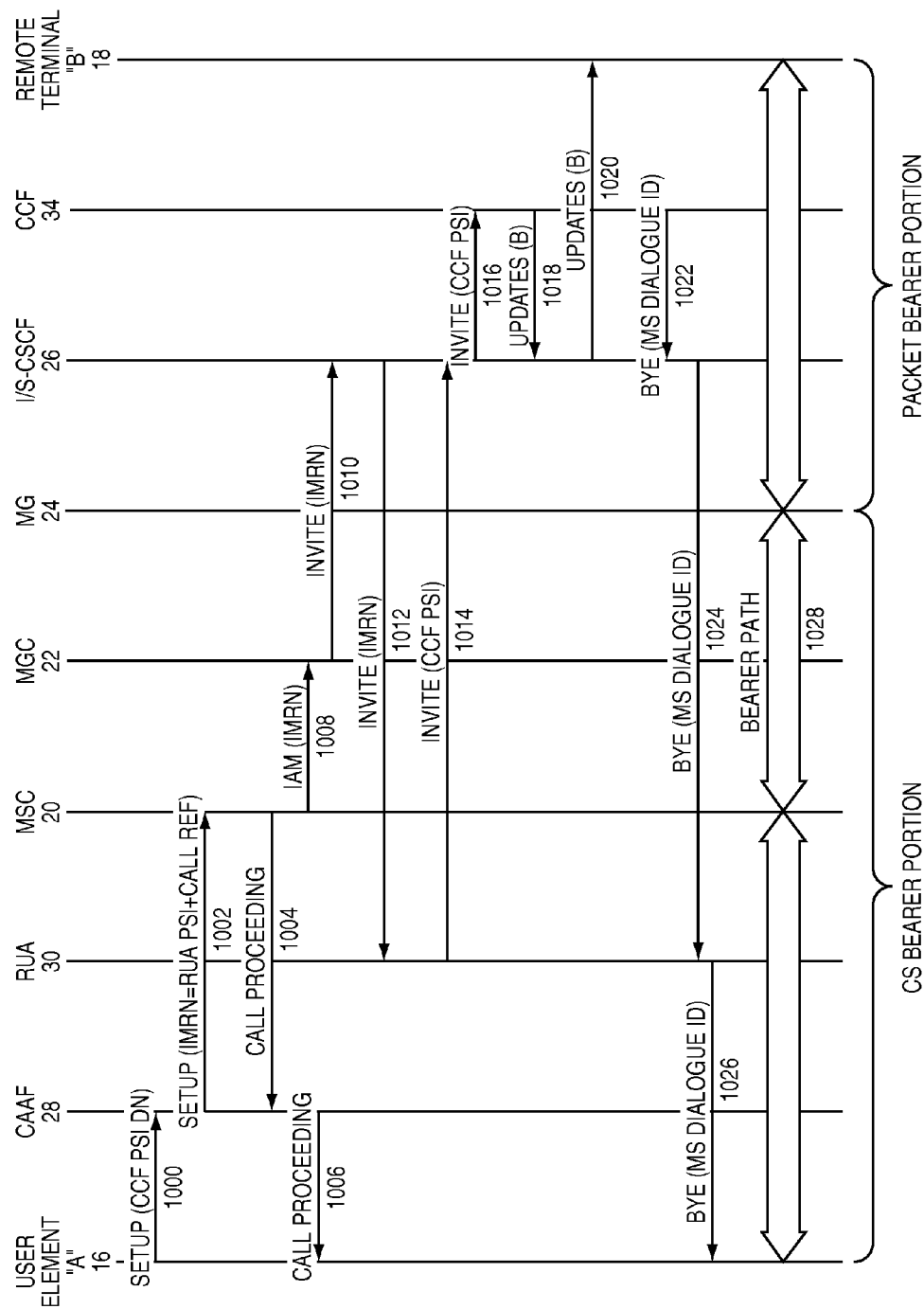
FIG. 16 is a communication flow illustrating a domain transfer to a circuit-switched subsystem, wherein SIP call control is provided in the RUA according to the fifth embodiment of the present invention.

With reference to FIG. 16, a communication flow is provided to illustrate a domain transfer to the CS 12, wherein SIP call control is provided by the RUA 30. To initiate the transfer, the user element 16 (A) will send a Setup message identifying the CCF PSI directory number. The Setup message is intercepted by the CAAF 28 (step 1000), which will generate an IMRN sufficient to route the call into the MS 14 to the RUA 30. The IMRN will also include a call reference component identifying the CCF PSI. The Setup message is sent to the MSC 20 (step 1002), which will respond by sending a Call Proceeding message to the CAAF 28 (step 1004), which will then forward the Call Proceeding message to the user element 16 (A) (step 1006).

The MSC 20 will also send an IAM to route the call to the MGC 22 (step 1008). At this point, the CS portion of the bearer path is being established between the user element 16 (A) and the media gateway 24 via the MSC 20. The MGC 22 will forward an Invite message including an IMRN toward the RUA 30 via the I/S-CSCF 26 (steps 1010 and 1012). The RUA 30 will process the IMRN to recover the CCF PSI, and then send an Invite message for the CCF 34 to the I/S-CSCF 26 (step 1014), which will forward the Invite message to the CCF 34 (step 1016). The CCF 34 will recognize the Invite message as a request for a transfer to the CS 12, and will generate session updates to alert the remote terminal 18 (B) of the domain transfer. The session updates are then sent to the remote terminal 18 (B) via the I/S-CSCF 26 (steps 1018 and 1020). At this point, the remote terminal 18 (B) and the media gateway 24 are configured to establish the packet-based portion of the bearer path. To release the prior packet bearer path and the associated signaling, the CCF 34 will send a Bye message toward the RUA 30 via the I/S-CSCF 26 (steps 1022 and 1024). The Bye message will include an MS dialogue ID identifying the old packet bearer path and associated signaling. The RUA 30 will process the Bye message to end the earlier session, and forward the Bye message to the user element 16 (A) (step 1026). At this point, the transfer is complete, and a new bearer path is created (step 1028). Again, the new bearer path is established between the user element 16 (A) and the remote terminal 18 (B) using the CS portion and the packet portion, which are interworked by the media gateway 24.

Figure 17:
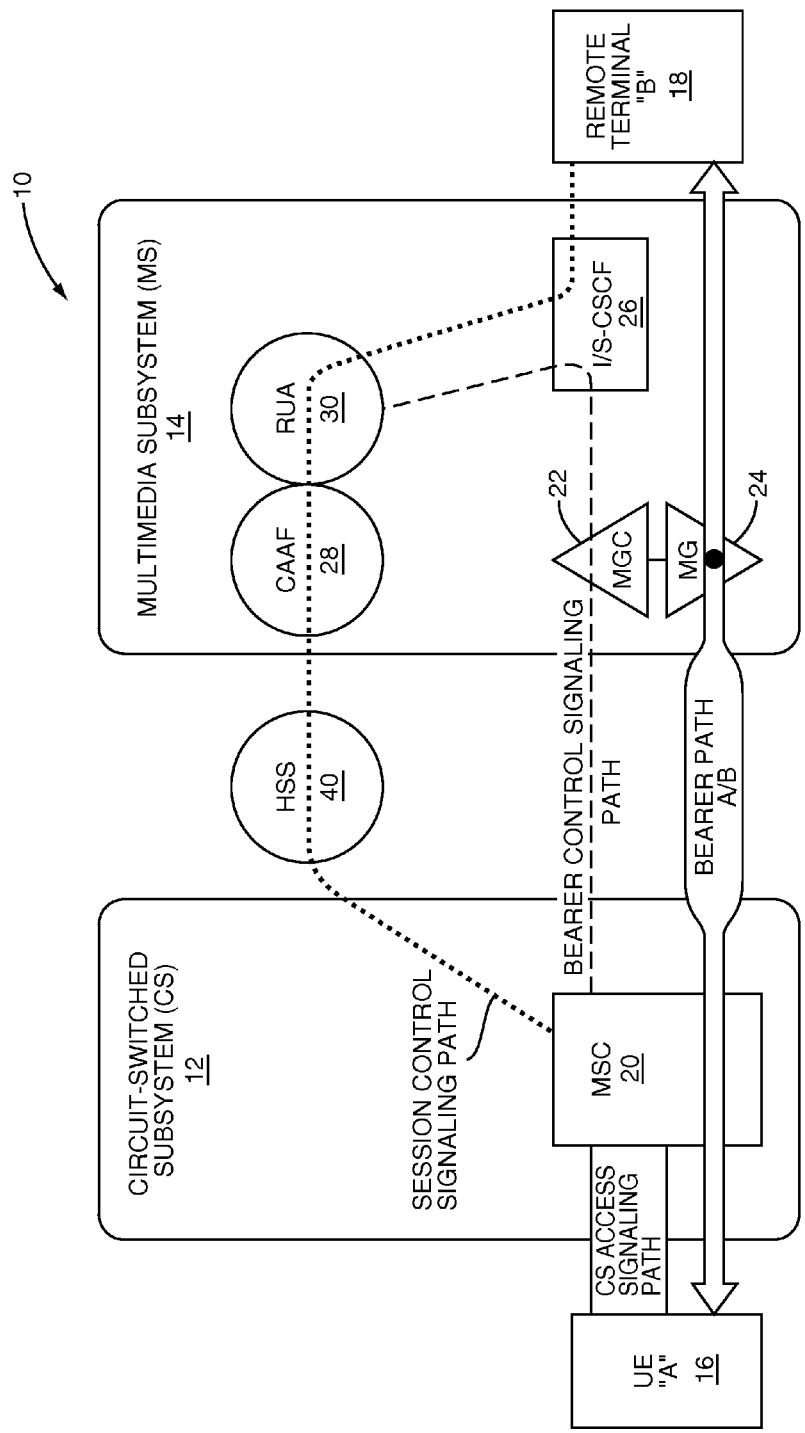
FIG. 17 is a communication environment according to a seventh embodiment of the present invention.

Yet another embodiment of the present invention is provided in FIG. 17, wherein the CS access signaling is provided from the user element 16 to the MSC 20 in traditional fashion. The MSC 20 is configured to provide the session control signaling to the CAAF 28 directly or via a home subscriber server (HSS) 40, which may be used to keep track of service-related information for subscribers. In light of this configuration, the CAAF 28 will not intercept CS access signaling between the user element 16 and the MSC 20 as in the prior embodiments. For a call between the user element 16 and the remote terminal 18, the bearer path again extends through the MSC 20 of the CS 12, and the media gateway 24 of the MS 14. The bearer control signaling path extends between the MSC 20 to the RUA 30 via the MGC 22, which is associated with the media gateway 24, and the I/S-CSCF 26.

The session control signaling extends through the HSS 40, CAAF 28, RUA 30, and perhaps through the I/S-CSCF 26 and the remote terminal 18. The CAAF 28 may be located proximate to or with the RUA 30. The CS call control channel again extends between the user element 16 and the RUA 30. In this embodiment, Unstructured Supplementary Service Data (USSD) is used as a transport mechanism to deliver information back and forth between the user element 16 and the remote terminal 18. As with the above embodiments, SIP call control may be provided in the user element 16 or in the RUA 30. When SIP call control is provided in the user element 16, the USSD signaling will embed SIP messages or like session control messages to facilitate SIP call control via the MS 14. When SIP call control is provided in the RUA 30, user input or other instructions are embedded in USSD messages. Those skilled in the art will recognize other mechanisms that may act as a delivery mechanism for the CS call control channel.

Figure 18:
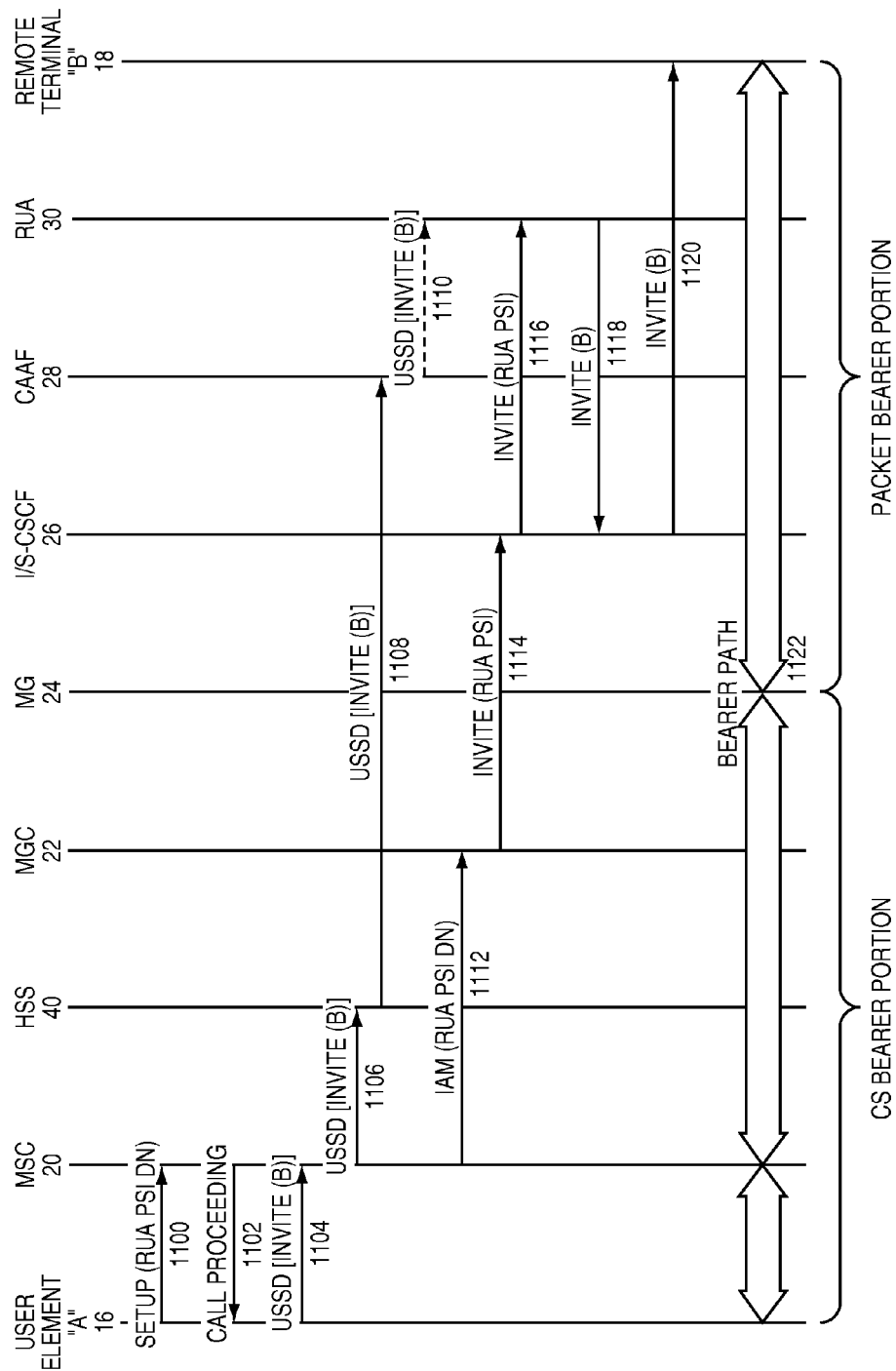
FIG. 18 is a communication flow illustrating initiation of a call when SIP call control is provided in the user element according to the seventh embodiment of the present invention.

With reference to FIG. 18, a communication flow is provided to illustrate initiating a call from a user element 16 (A) to the remote terminal 18 (B) when SIP call control is provided in the user element 16. Initially, the user element 16 (A) will send a Setup message directed to the PSI directory number for the RUA 30 to the MSC 20 (step 1100). The MSC 20 will respond by providing a Call Proceeding message back to the user element 16 (step 1102). The MSC 20 is provisioned to await a USSD message from the user element 16. The user element 16 will embed an Invite message to initiate a call to the remote terminal 18 (B) in a USSD message, which is sent to the MSC 20 (step 1104). The MSC 20 will forward the USSD message with the embedded Invite to the HSS 40 (step 1106). The HSS 40 will deliver the USSD message with the embedded Invite to the CAAF 28 (step 1108), which will process the USSD message and provide the Invite information to the RUA 30 (step 1110). As noted above, the USSD messages need not pass through the HSS 40.

The MSC 20 will also send an IAM toward the MGC 22 using the PSI directory number for the RUA 30 (step 1112). The MGC 22 will process the IAM and forward an Invite message toward the PSI for the RUA 30 in the MS 14 to the I/S-CSCF 26 (step 1114). The I/S-CSCF 26 will forward the Invite message to the RUA 30 (step 1116). At this point, the CS portion of the bearer path is established between the user element 16 and the media gateway 24 via the MSC 20. The RUA 30 will recognize that the CS portion of the bearer path is established, and forward the SIP Invite message recovered from the CS call control channel toward the remote terminal 18 via the I/S-CSCF 26 (steps 1118 and 1120). At this point, the packet portion of the bearer path is established between the media gateway 24 and the remote terminal 18 (B). The two portions of the bearer path are interworked by the media gateway 24 to form a bearer path between the user element 16 and the remote terminal 18 (step 1122). SIP call control for the call will remain in the user element 16.

Figure 19:
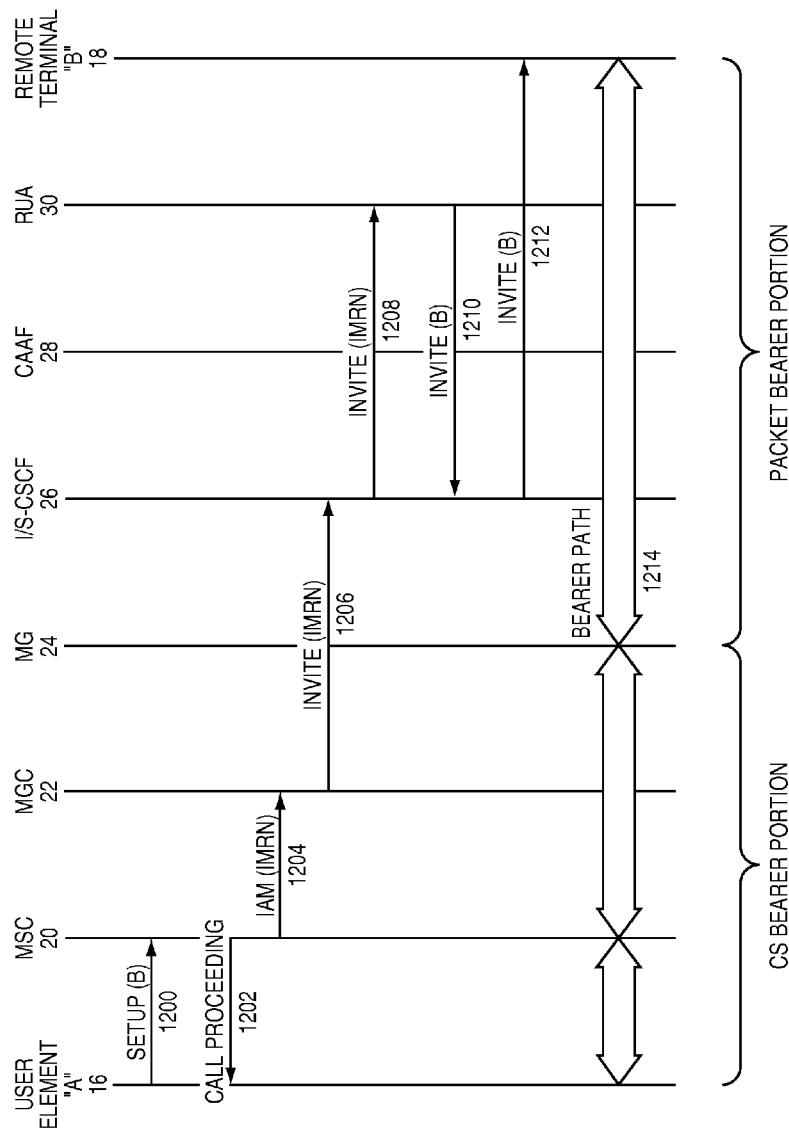
FIG. 19 is a communication flow illustrating initiation of a call when SIP call control is provided in the RUA according to the seventh embodiment of the present invention.

With reference to FIG. 19, a communication flow is provided where user element 16 (A) initiates a call to the remote terminal 18 (B), wherein SIP call control is provided by the RUA 30 on behalf of the user element 16. Initially, user element 16 (A) will initiate a call to remote terminal 18 (B) by sending a Setup message identifying the remote terminal 18 (B) to the MSC 20 (step 1200). The MSC 20 will respond by sending a Call Proceeding message back to the user element 16 (step 1202), as well as generating an IMRN based on the RUA PSI and the call reference information, which includes information regarding the remote terminal 18 (B). The MSC 20 may use Customized Application for Mobile Enhanced Logic (CAMEL) origination triggers to invoke a CAMEL service that redirects calls intended for parties served by the MS 14 to the MS 14 via the MGC 22. As such, the MSC 20 will generate an IAM with the IMRN, and send the IAM to the MGC 22 (step 1204), which will process the IAM and generate a corresponding Invite message directed to the RUA 30. The Invite message is initially sent to the I/S-CSCF (step 1206), which will forward the Invite message to the RUA 30 (step 1208).

The RUA 30 will process the IMRN to determine the called party and generate an appropriate Invite message. As such, the RUA 30 will send an Invite message toward the remote terminal 18 (B) via the I/S-CSCF 26 (steps 1210 and 1212). The Invite message will provide the requisite information to the remote terminal 18 (B) to establish a packet portion of the bearer path with the media gateway 24. By routing the call through the CS 12 to the MS 14, the CS portion of the bearer path is established between the user element 16 and the media gateway 24 via the MSC 20, such that the overall bearer path is established between the user element 16 and the remote terminal 18 (step 1214). As indicated below, USSD may be employed to exchange user or terminal input between the user element 16 and the RUA 30 using the CS call control channel, which is supported by USSD.

Figure 20:
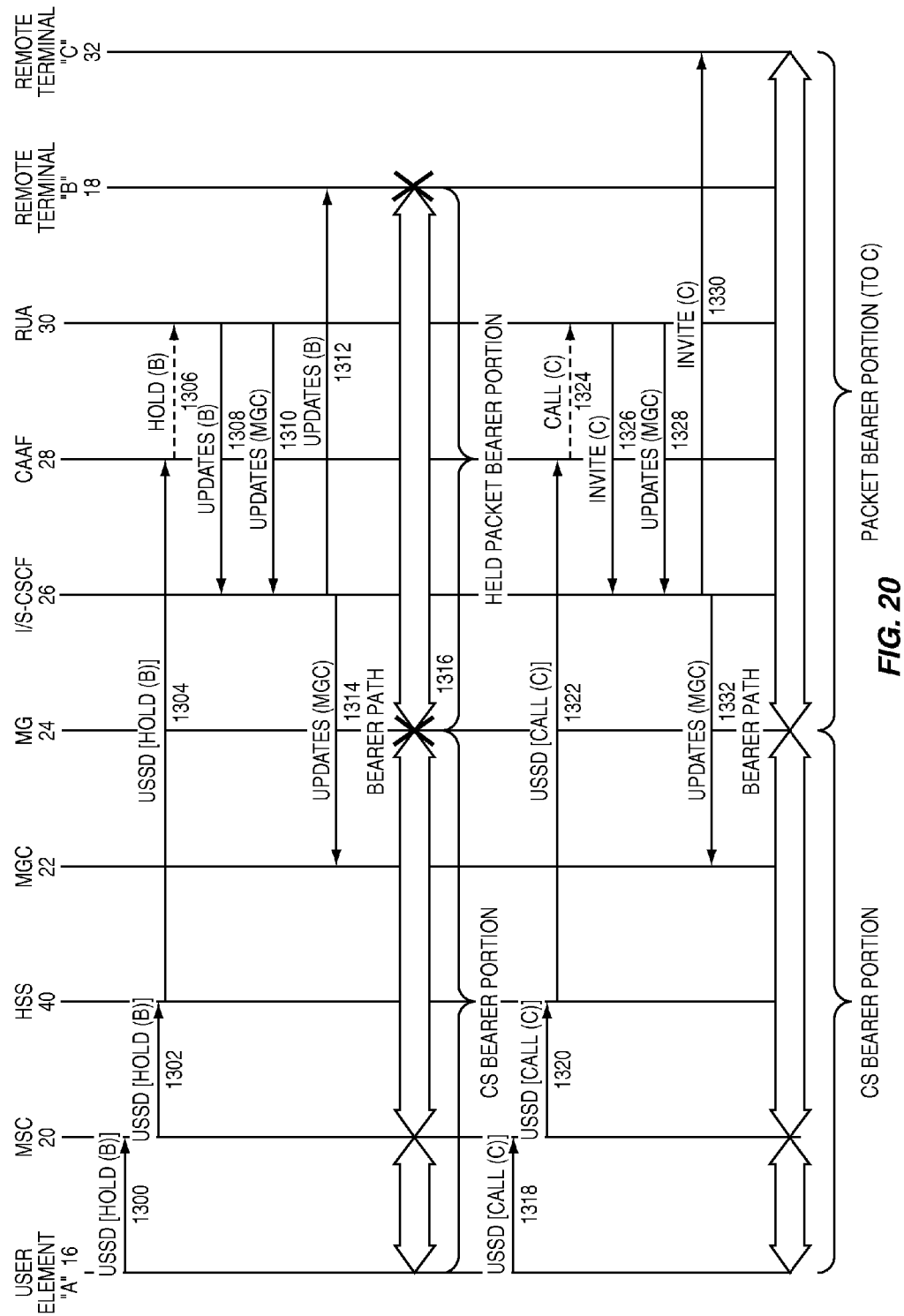
FIG. 20 is a communication flow wherein a first call is held and a second call is initiated according to the seventh embodiment of the present invention.

Turning now to FIG. 20, a communication flow is provided wherein the call between the user element 16 (A) and the remote terminal 18 (B) is held, and a call from the user terminal 16 (A) is initiated to the remote terminal 32 (C). Throughout this communication flow, the SIP call control may be provided in the user element 16 or in the RUA 30. The CS call control channel will be established in either case. The CS call control channel will embed SIP messages in USSD messages when SIP call control is provided in the user element 16, and embed user input or other control information in USSD messages when SIP call control is provided in the RUA 30.

Assuming a session has been established between the user element 16 (A) and the remote terminal 18 (B) as described in association with FIG. 18, the user element 16 (A) can place the call on hold. To do so, the user element will embed an appropriate SIP message to implement a hold or appropriate user input indicating that the call should be put on hold in a USSD message, which is sent to the MSC 20 (step 1300). The MSC 20 will send the USSD message to the HSS 40 (step 1302), which will forward the USSD message to the CAAF 28 (step 1304). Again, the USSD messages need not pass through the HSS 40 in alternate embodiments. The CAAF 28 will process the USSD message to extract the embedded SIP message or other information, depending on the location of the SIP call control, and forward the hold information to the RUA 30 (step 1306). The RUA 30 will recognize that the call to the remote terminal 18 (B) should be placed on hold, and will generate session updates, which are sent to the I/S-CSCF 26 for delivery to the remote terminal 18 (B) (step 1308). The RUA 30 will also send session updates for the MGC 22 toward the I/S-CSCF 26 (step 1310). The session updates for the remote terminal 18 (B) and the MGC 22 are delivered to the respective entities by the I/S-CSCF 26 (steps 1312 and 1314).

At this time, the packet portion of the bearer path is held, while the CS portion of the bearer path remains intact and will be used to support the call to be made to the remote terminal 32 (C) (step 316). To initiate a call to the remote terminal 32 (C), the user element 16 (A) will embed call initiation information in the form of a SIP Invite message or other appropriate control information in a USSD message, and send the USSD message to the MSC 20 (step 1318). The MSC 20 will forward the USSD message to the HSS 40 (step 1320), which will forward the USSD message to the CAAF 28 (step 1322). Again, the CAAF 28 will process the USSD message to extract the embedded information, and send information in an appropriate format to the RUA 30 to indicate that the user element 16 (A) desires to initiate a call to the remote terminal 32 (C) (step 1324). As such, the RUA 30 will send an Invite message toward the remote terminal 32 (C). The Invite message is initially sent to the I/S-CSCF 26 (step 1326). The RUA 30 will also provide session updates for the MGC 22 to indicate that the packet portion of the bearer path is to be established with the remote terminal 32 (C) to the I/S-CSCF 26 (step 1328). The I/S-CSCF 26 will forward the Invite message to the remote terminal 32 (C) and the session updates to the MGC 22 to enable the packet portion of the bearer path between the media gateway 24 and the remote terminal 32 (C) (steps 1330 and 1332). The CS portion of the bearer path from the earlier call remains intact, and the media gateway 24 will interwork the CS portion and the newly created packet portion of the bearer path to create an overall bearer path between the user element 16 (A) and the remote terminal 32 (C) (step 1334).

Figure 21:
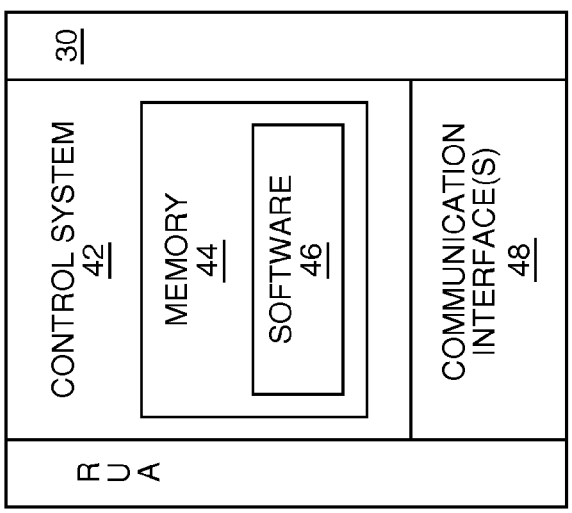
FIG. 21 is a block representation of a remote user agent according to one embodiment of the present invention.

Turning now to FIG. 21, a block representation of an RUA 30 is illustrated. The RUA 30 may include a control system 42 having sufficient memory 44 for the requisite software 46 to operate as described above. The control system 42 may also be associated with one or more communication interfaces 48 to facilitate interaction with other nodes as described above.

Figure 22:
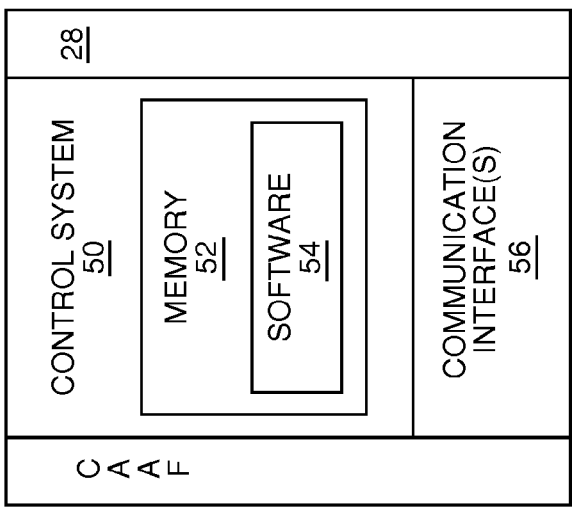
FIG. 22 is a block representation of a CS Access Adaptation Function according to one embodiment of the present invention.

With reference to FIG. 22, a block representation of a CAAF 28 is illustrated. The CAAF 28 may include a control system 50 having sufficient memory 52 for the requisite software 54 to operate as described above. The control system 50 may also be associated with one or more communication interfaces 56 to facilitate interaction with other nodes as described above.

Figure 23:
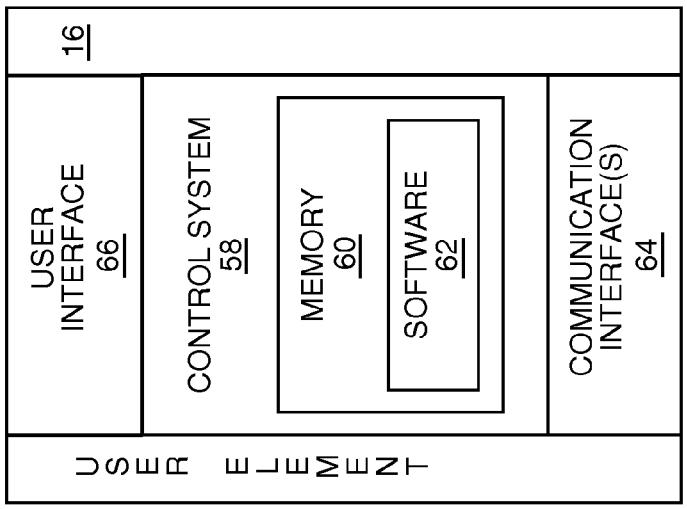
FIG. 23 is a block representation of a user element according to one embodiment of the present invention.

Turning now to FIG. 23, a block representation of a user element 16 is illustrated. The user element 16 may include a control system 58 having sufficient memory 60 for the requisite software 62 to operate as described above. The control system 58 may be associated with one or more communication interfaces 64 to facilitate interaction with other nodes as described above. The control system 58 may also be associated with a user interface 66, which provides the requisite speaker, microphone, keypad, and display necessary for initiating, accepting, and facilitating communications.

Figure 24:
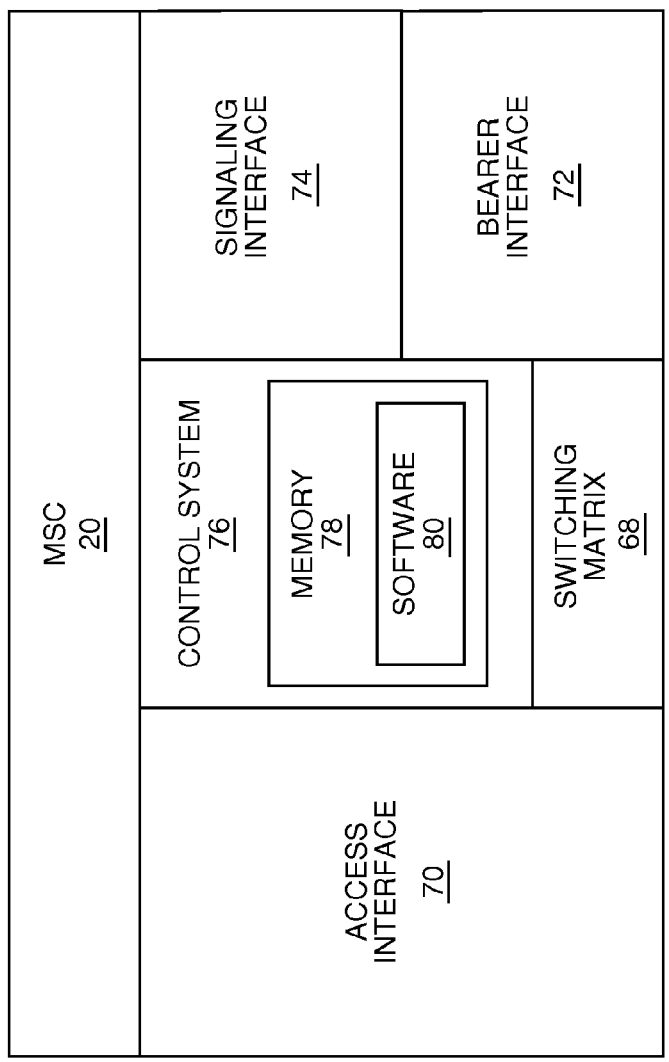
FIG. 24 is a block representation of a mobile switching center according to one embodiment of the present invention.

FIG. 24 is a block representation of an MSC 20. The MSC 20 will include a switching matrix 68, which couples an access interface 70 and a bearer interface 72. The access interface 70 is adapted to communicate with an appropriate access network, such as a network of base stations in a cellular communication environment. The bearer interface 72 is adapted to interface with the CS 12, and in particular lines or trunks leading to a circuit-switched core of the CS 12. A signaling interface 74 is also provided to facilitate signaling with the CAAF 28, HSS 40, MGC 22, and the like. The access interface 70 is generally configured to support signaling and bearer paths toward the user element 16 and the like. The access interface 70, switching matrix 68, bearer interface 72, and signaling interface 74 are generally associated with a control system 76 having sufficient memory 78 for the requisite software 80 to operate as described above.

Those skilled in the art will recognize improvements and modifications to the preferred embodiments of the present invention. All such improvements and modifications are considered within the scope of the concepts disclosed herein and the claims that follow.

What is claimed is:

1. A method for providing session control from a multimedia subsystem for a user element in a circuit-switched subsystem comprising:
    establishing, for a session, a session control signaling path between a user element in a circuit-switched subsystem and a remote user agent in a multimedia subsystem and representing the user element to the multimedia subsystem, such that the multimedia subsystem provides overall session control for the session, wherein the session control signaling path is established through an adaptation function of the circuit-switched subsystem, the adaptation function being implemented by a processor;
    establishing a bearer control signaling path for the session, at least a portion of which is different from the session control signaling path, from the remote user agent into the circuit-switched subsystem through a media gateway control function and a mobile switching center, the bearer control signaling path supporting a circuit-switched portion of a bearer path for the session between the mobile switching center and a media gateway associated with the media gateway control function; and
    establishing a remote signaling session path from the remote user agent toward a remote terminal through the multimedia subsystem,
    wherein the adaptation function receives from the user element access signaling using a circuit-switched protocol and comprising mobility signaling, session control signaling, and bearer control signaling, and wherein the adaptation function routes the mobility signaling to the mobile switching center, routes the session control signaling to the remote user agent via the session control signaling path, and routes the bearer control signaling to the mobile switching center via the bearer control signaling path, wherein the session control signaling path does not extend through the media gateway control function and wherein the adaption function is positioned between the user element and the mobile switching center supporting the user element in the circuit-switched subsystem.

2. The method of claim 1 wherein the adaptation function provides protocol conversion along the session control signaling path to facilitate signaling between the circuit-switched subsystem and the remote user agent.

3. The method of claim 1 comprising anchoring session signaling for the session control path at a call control function (CCF) separate from the remote user agent and the media gateway control function and using the CCF to facilitate service continuity during a domain transfer of the session such that the bearer path is fully supported by a packet subsystem (PS).

4. The method of claim 1 wherein an initial session originated from the user element and intended for the remote terminal is initially routed toward the remote user agent via the bearer signaling path to establish the circuit-switched portion of the bearer path for the session.

5. The method of claim 4 further comprising establishing a second session control signaling path for a subsequent session between the user element and the remote user agent, such that the multimedia subsystem provides session control for the subsequent session, and the circuit-switched portion of the bearer path is used to support the subsequent session.

6. The method of claim 1 wherein a session control protocol of the multimedia subsystem is employed between the adaptation function and the remote user agent.

7. The method of claim 6 wherein a circuit-switched signaling protocol is employed between the adaptation function and the user element, such that session control messages are embedded in the circuit-switched signaling messages of the circuit-switched signaling protocol.

8. The method of claim 1 wherein the bearer control signaling path is routed through a control function of the multimedia subsystem between the remote user agent and the media gateway control function.

9. The method of claim 1 wherein the bearer path further comprises a packet portion associated with the multimedia subsystem.

10. The method of claim 1 further comprising facilitating session signaling between the user element and the remote user agent for controlling the session over the session control signaling path.

11. The method of claim 1 wherein session control for the user element is provided by the user element, and session control signaling is exchanged between the multimedia subsystem and the user element via the session control signaling path.

12. The method of claim 11 wherein the session control signaling path, bearer control signaling path, and circuit-switched portion of the bearer path are established upon effecting a transfer of the session to the circuit-switched subsystem from a packet subsystem associated with the multimedia subsystem.

13. The method of claim 11 wherein the user element maintains session state information across a transfer of the session between the circuit-switched subsystem and a packet subsystem associated with the multimedia subsystem.

14. The method of claim 13 wherein during a transfer of the session to a packet subsystem associated with the multimedia subsystem from the circuit-switched subsystem, a new session control signaling path is between the remote user agent and the user element.

15. The method of claim 13 wherein the session control signaling path, bearer control signaling path, and the circuit-switched portion of the bearer path are established upon effecting a transfer of the session to the circuit-switched subsystem from a packet subsystem associated with the multimedia subsystem.

16. The method of claim 13 wherein the remote user agent maintains session state information across a transfer of the session between the circuit-switched subsystem and a packet subsystem associated with the multimedia subsystem.

17. The method of claim 1 wherein session control for the user element is provided by the remote user agent; session control signaling is exchanged between the multimedia subsystem and the remote user agent; and user input is provided from the user element to the remote user agent via the session control signaling path.

18. The method of claim 1 wherein a home subscriber service is positioned in the session control signaling path between the adaptation function and the mobile switching center.

19. The method of claim 1 wherein the mobile switching center receives access signaling comprising session control signaling and bearer control signaling from the user element, and routes the session control signaling toward the adaptation function over the session control signaling path and routes the bearer control signaling over the bearer control signaling path.

20. A system for providing session control from a multimedia subsystem for a user element in a circuit-switched subsystem comprising:
a processor;
an adaptation function of the circuit switched subsystem and being implemented by the processor, the adaptation function for establishing, for a session, a session control signaling path between a user element in a circuit-switched subsystem and a remote user agent in a multimedia subsystem and representing the user element to the multimedia subsystem, such that the multimedia subsystem provides overall session control for the session, wherein the session control signaling path is established through the adaptation function;
the adaptation function establishing a bearer control signaling path for the session, at least a portion of which is different from the session control signaling path, from the remote user agent into the circuit-switched subsystem through a media gateway control function and a mobile switching center, the bearer control signaling path supporting a circuit-switched portion of a bearer path for the session between the mobile switching center and a media gateway associated with the media gateway control function; and
the remote user agent establishing a remote signaling session path from the remote user agent toward a remote terminal through the multimedia subsystem,
wherein the adaptation function receives from the user element access signaling using a circuit-switched protocol and comprising mobility signaling, session control signaling, and bearer control signaling, and wherein the adaptation function routes the mobility signaling to the mobile switching center, routes the session control signaling to the remote user agent via the session control signaling path, and routes the bearer control signaling to the mobile switching center via the bearer control signaling path, wherein the session control signaling path does not extend through the media gateway control function and wherein the adaption function is positioned between the user element and the mobile switching center supporting the user element in the circuit-switched subsystem.

* * * * *